US011743964B2

(12) United States Patent
Ahn et al.

(10) Patent No.: US 11,743,964 B2
(45) **Date of Patent: *Aug. 29, 2023**

(54) METHOD FOR PERFORMING BEAM FAILURE RECOVERY IN WIRELESS COMMUNICATION SYSTEM AND APPARATUS FOR THE SAME

(71) Applicant: LG ELECTRONICS INC., Seoul (KR)

(72) Inventors: Minki Ahn, Seoul (KR); Jiwon Kang, Seoul (KR); Kijun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,207

(22) Filed: Dec. 7, 2021

(65) Prior Publication Data

US 2022/0095406 A1 Mar. 24, 2022

Related U.S. Application Data

(63) Continuation of application No. 16/623,299, filed as application No. PCT/KR2018/006083 on May 29, 2018, now Pat. No. 11,229,081.

(Continued)

(51) Int. Cl.

*H04W 76/19* (2018.01)
*H04B 7/06* (2006.01)
*H04W 74/00* (2009.01)

(52) U.S. Cl.

CPC .......... *H04W 76/19* (2018.02); *H04B 7/0626* (2013.01); *H04W 74/004* (2013.01); *H04W 74/006* (2013.01)

(58) Field of Classification Search

None

See application file for complete search history.

(56) References Cited

U.S. PATENT DOCUMENTS

2018/0227899 A1 8/2018 Yu et al.
2018/0302889 A1* 10/2018 Guo ...................... H04L 5/0085

(Continued)

FOREIGN PATENT DOCUMENTS

WO WO2017024516 2/2017
WO WO2018203719 11/2018

OTHER PUBLICATIONS

CATT, Discussion on DL beam recovety, R1-1707477, 3GPP TSG RAN WG1 Meeting #89, Hangzhou, China, May 15-19, 2017, 5 pages.

(Continued)

*Primary Examiner* — Steve R Young

(74) *Attorney, Agent, or Firm* — Fish & Richardson P.C.

(57) ABSTRACT

The present disclosure provides a method for recovering a beam failure in a wireless communication system. The method performed by an user equipment (UE) according to the present disclosure includes receiving a resource configuration in relation to a beam failure recovery request from a base station (BS); receiving a beam reference signal (BRS) used for beam management from the BS; transmitting the beam failure recovery request to the BS using a first resource based on the resource configuration, when a beam failure even is detected; and reporting a measurement result by the beam reference signal to the BS.

9 Claims, 9 Drawing Sheets

Start

Receive resource configuration in relation to beam failure recovery request from eNB — S910

Receive beam reference signal from eNB — S920

Transmit beam failure recovery request to eNB when detecting beam failure event — S930

Report measurement result by beam reference signal to eNB when beam reporting is triggered — S940

End

Related U.S. Application Data

(60) Provisional application No. 62/537,967, filed on Jul. 28, 2017, provisional application No. 62/521,253, filed on Jun. 16, 2017.

(56) References Cited

U.S. PATENT DOCUMENTS

| | | | | |
|---|---|---|---|---|
| 2018/0368126 | A1 | 12/2018 | Islam et al. | |
| 2018/0368142 | A1 | 12/2018 | Liou | |
| 2019/0052337 | A1 | 2/2019 | Kwon et al. | |
| 2019/0081753 | A1* | 3/2019 | Jung | H04B 7/088 |
| 2020/0059285 | A1* | 2/2020 | Zhang | H04W 24/10 |
| 2020/0186218 | A1* | 6/2020 | Wu | H04W 72/21 |
| 2021/0083747 | A1 | 3/2021 | Zhou et al. | |

OTHER PUBLICATIONS

CHTTL, Discussion on beam failure recovery, R1-1708380, 3GPP TSG RAN WG1 Meeting #89, Hangzhou, P.R. China, May 15-19, 2017, 5 pages.

EP Office Action in European Appln. No. 18817854.5, dated Mar. 25, 2021, 10 pages.

Extended European Search Report in European Appln. No. 18817854.5, dated Jul. 21, 2020, 14 pages.

Huawei, HiSilicon, "Beam failure recovery," R1-1708135, 3GPPTSG RAN WG1 Meeting #89, Hangzhou, China, dated May 15-19, 2017, 9 pages.

Huawei, HiSilicon, "Link recovery procedure for beam failure", R1-1704230, 3GPP TSG RAN WG1 Meeting #88b, Spokane, USA, Apr. 3-7, 2017, 7 pages.

Institute for Information Industry (III), "Discussion on beam failure recovery mechanism", R1-1708874, 3GPP TSG-RANWG1 Meeting #89, Hangzhou, China May 15-19, 2017, 5 pages.

Intel Corporation, "Discussion for Mechanism to Recover from Beam Failure", R1-1707356, 3GPP TSG-RAN WG1 #89, Hangzhou, China, May 15-19, 2017, 5 pages.

JP Office Action in Japanese Appln. No. 2019-569780, dated Mar. 2, 2021, 7 pages (with English translation).

MCC Support, "Draft Report of 3GPP TSG RAN WG1 #89 v0.1.0," XP051285670, 3GPP TSG RAN WG1 Meeting #90, Prague, Czech Rep, dated Aug. 21-25, 2017, 162 pages.

NEC, "Low latency beam failure recovery by PRACH/PRACH-like", R1-1707814, 3GPP TSG RAN WG1 Meeting #89, Hangzhou, P.R. China May 15-19, 2017, 2 pages.

PCT International Search Report in International Application No. PCT/KR2018/006083, dated Sep. 21, 2018, 3 pages.

Qualcomm Incorporated, "Beam recovery request," R2-1706926, 3GPP TSG-RAN WG2 Meeting NR ad-hoc, Qingdao, China, dated Jun. 27-29, 2017, 3 pages.

Spreadtrum Communications, Discussion on UE initiated recovery from beam failure, R1-1707782, 3GPP TSG RAN WG1 Meeting #89, Hangzhou, P.R. China May 15-19, 2017, 5 pages.

* cited by examiner

METHOD FOR PERFORMING BEAM FAILURE RECOVERY IN WIRELESS COMMUNICATION SYSTEM AND APPARATUS FOR THE SAME

CROSS-REFERENCE TO RELATED APPLICATIONS

This application is a continuation of U.S. application Ser. No. 16/623,299, filed on Dec. 16, 2019, which is the National Stage filing under 35 U.S.C. 371 of International Application No. PCT/KR2018/006083, filed on May 29, 2018, which claims the benefit of U.S. Provisional Application No. 62/521,253 filed on Jun. 16, 2017 and which claims the benefit of U.S. Provisional Application No. 62/537,967 filed on Jul. 28, 2017, the contents of which are all hereby incorporated by reference herein in their entirety.

TECHNICAL FIELD

The present invention relates to wireless communications, and more particularly, to a method for performing a beam failure recovery and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present disclosure is to propose a method for configuring a resource in relation to a beam failure recovery.

In addition, an object of the present disclosure is to define a control channel or a control signal for transmitting a beam failure recovery request.

In addition, an object of the present disclosure is to define a transmission priority relation between a beam failure recovery request and other control channels.

In addition, an object of the present disclosure is to define an operation method of a terminal when a response to beam failure recovery request is not received.

The technical objects to attain in the present disclosure are not limited to the above-described technical objects and other technical objects which are not described herein will become apparent to those skilled in the art from the following description.

A method for performing a beam failure recovery performed by a user equipment (UE) in a wireless communication system according to the present disclosure includes receiving a resource configuration in relation to a beam failure recovery request from a base station (BS); receiving a beam reference signal (BRS) used for beam management from the BS; transmitting the beam failure recovery request to the BS using a first resource based on the resource configuration, when a beam failure even is detected; and reporting a measurement result by the beam reference signal to the BS, when a beam reporting is triggered, and the first resource is Physical Random Access Channel (PRACH) or Physical Uplink Control Channel (PUCCH).

In addition, in the present disclosure, when the first resource is the PRACH, the PRACH is non-contention based PRACH.

In addition, in the present disclosure, when the first resource is the PUCCH, the beam failure recovery request uses an indicator type PUCCH that indicates only whether a beam failure is occurred or a message type PUCCH that includes information of a candidate beam.

In addition, in the present disclosure, when the beam failure event is a beam failure for a specific serving beam link, the beam failure recovery request uses the message type PUCCH.

In addition, in the present disclosure, the method further includes retransmitting the beam failure recovery request using a second resource, when the UE fails to receive a response to the beam failure recovery request from the BS.

In addition, in the present disclosure, the second resource is contention based PRACH.

In addition, in the present disclosure, when the beam failure recovery request is overlapped with other PUCCH format in the first resource, the other PUCCH format is dropped.

In addition, in the present disclosure, when the beam failure recovery request is the message type PUCCH, a response to the beam failure recovery request is received by assuming Quasi co-location (QCL) in the reference signal (RS) of the candidate beam.

In addition, a user equipment (UE) for performing a beam failure recovery in a wireless communication system according to the present disclosure includes a radio frequency (RF) module for transmitting and receiving a radio signal; and a processor functionally connected with the RF module, the processor is configured to perform: receiving a resource configuration in relation to a beam failure recovery request from a base station (BS); receiving a beam reference signal (BRS) used for beam management from the BS; transmitting the beam failure recovery request to the BS using a first resource based on the resource configuration, when a beam failure even is detected; and reporting a measurement result by the beam reference signal to the BS, when a beam reporting is triggered, and the first resource is Physical Random Access Channel (PRACH) or Physical Uplink Control Channel (PUCCH).

TECHNICAL EFFECTS

According to the present disclosure, a control channel is defined for transmitting a beam failure recovery request, and there is an effect that a beam failure recovery is quickly performed when a beam failure occurs in a terminal.

In addition, according to the present disclosure, the highest priority is set in a beam failure recovery request, and there is an effect that a problem of overlapping with other control channel may be solved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION

Figure 1:
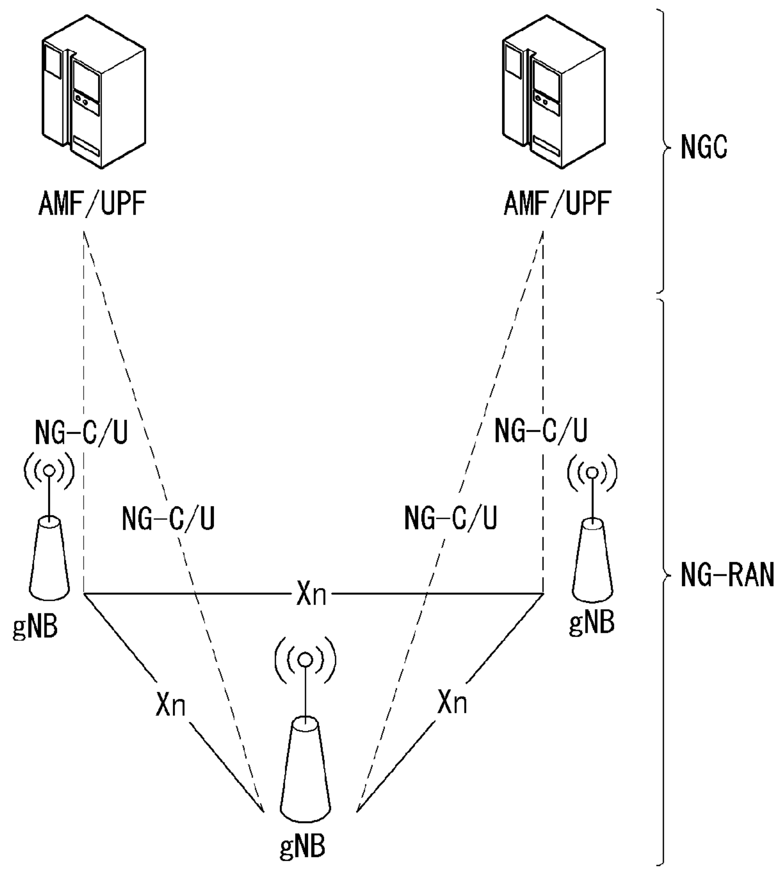
FIG. 1 is a diagram illustrating an example of an overall system structure of NR to which the method proposed in the present disclosure may be applied.

Hereinafter, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in the present disclosure is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

Hereinafter, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Also, all of the terms disclosed in this document may be explained with reference to the standard documents.

To clarify the descriptions, this document is based on the 3GPP LTE/LTE-A, but the technical features of the present invention are not limited to the current descriptions.

Definitions of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Overview of System

FIG. 1 is a diagram illustrating an example of an overall system structure of NR to which the method proposed in the present disclosure may be applied.

Referring to FIG. 1, an NG-RAN includes gNBs that provide a control plane (RRC) protocol terminal point for NG-RA user plane (new AS sublayer/PDCP/RLC/MAC/PHY) and a User Equipment (UE).

The gNBs are interconnected through Xn interface.

In addition, the gNB is connected to an NGC through NG interface.

More particularly, the gNB is connected to an Access and Mobility Management Function (AMF) through N2 interface, and connected to a User Plane Function (UPF) through N3 interface.

New Rat (NR) Numerology and Frame Structure

In an NR system, a plurality of numerologies may be supported. Here, the numerology may be defined by subcarrier spacing and a Cyclic Prefix (CP) overhead. At this time, a plurality of subcarrier spacing may be derived by scaling a basic subcarrier spacing into an integer N (or μ). In addition, even though it is assumed that very low subcarrier spacing is not used in very high carrier frequency, a numerology which is used may be selected independently from a frequency band.

Furthermore, in an NR system, various frame structures according to a plurality of numerologies may be supported. Hereinafter, Orthogonal Frequency Division Multiplexing (OFDM) numerology and a frame structure will be described, which may be considered in an NR system.

A plurality of OFDM numerologies supported in an NR system may be defined as represented in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in an NR system, a size of various fields in a time domain is represented as a multiple of a time unit of $T_s=1/(\Delta f_{max} \cdot N_f)$.

Herein, $\Delta f_{max}=480 \cdot 10^3$ and $N_f=4096$. Downlink and uplink transmissions include a radio frame having a duration of $T_f=(\Delta f_{max} N_f/100) \cdot T_s=10$ ms. Here, the radio frame includes 10 subframes having a duration of $T_{sf}=(\Delta f_{max} N_f/1000) \cdot T_s=1$ ms, respectively. In this case, there may be a set of frames for uplink and a set of frames for downlink.

Figure 2:
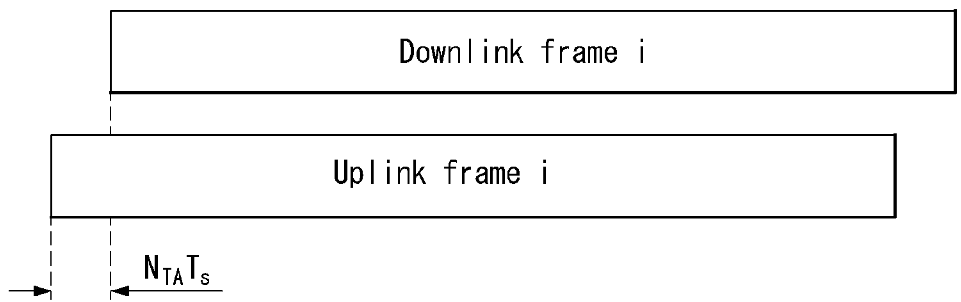
FIG. 2 illustrates a relation between an uplink frame and a downlink frame in a wireless communication system to which the method proposed in the present disclosure may be applied.

FIG. 2 illustrates a relation between an uplink frame and a downlink frame in a wireless communication system to which the method proposed in the present disclosure may be applied.

As shown in FIG. 2, a transmission of uplink frame number i from a User Equipment (UE) should be started earlier by $T_{TA}=N_{TA}T_s$ than a start of the corresponding downlink frame in the corresponding UE.

With respect to numerology μ, slots are numbered in an ascending order of $n_s^{\mu} \in \{0, \ldots, N_{subframe}^{slots,\mu}-1\}$ in a subframe, and numbered in an ascending order of $n_{s,f}^{\mu} \in \{0, \ldots, N_{frame}^{slots,\mu}-1\}$ in a radio frame. A single slot includes $N_{symb}^{\mu}$ consecutive OFDM symbols, and $N_{symb}^{\mu}$ is determined according to numerology which is used and a slot configuration. A start of slot $n_s^{\mu}$ in a subframe is temporally aligned with a start of OFDM symbol $n_s^{\mu} N_{symb}^{\mu}$ in the same subframe.

Not all UEs are available to transmit and receive simultaneously, and this means that not all OFDM symbols of downlink slot and uplink slot are available to be used.

Table 2 represents the number of OFDM symbols for each slot with respect to normal CP in numerology μ, and Table 3 represents the number of OFDM symbols for each slot with respect to extended CP.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding the physical resource in an NR system, antenna ports, resource grids, resource elements, resource blocks, carrier part, and the like can be considered.

Hereinafter, the physical resources that can be considered in an NR system are described in detail.

First, regarding the antenna port, an antenna port is defined such that a channel through which a symbol on an antenna port is carried is inferred from a channel through which other symbol on the same antenna port is carried. In the case that a large-scale property of a channel through which a symbol on an antenna port is available to be inferred from a channel through which a symbol on different antenna port is carried, it is referred that two antenna ports are in quasi co-located or quasi co-location (QC/QCL) relation.

Here, the large-scale property includes at least one of Delay spread, Doppler spread, Frequency shift, Average received power, and Received Timing.

Figure 3:
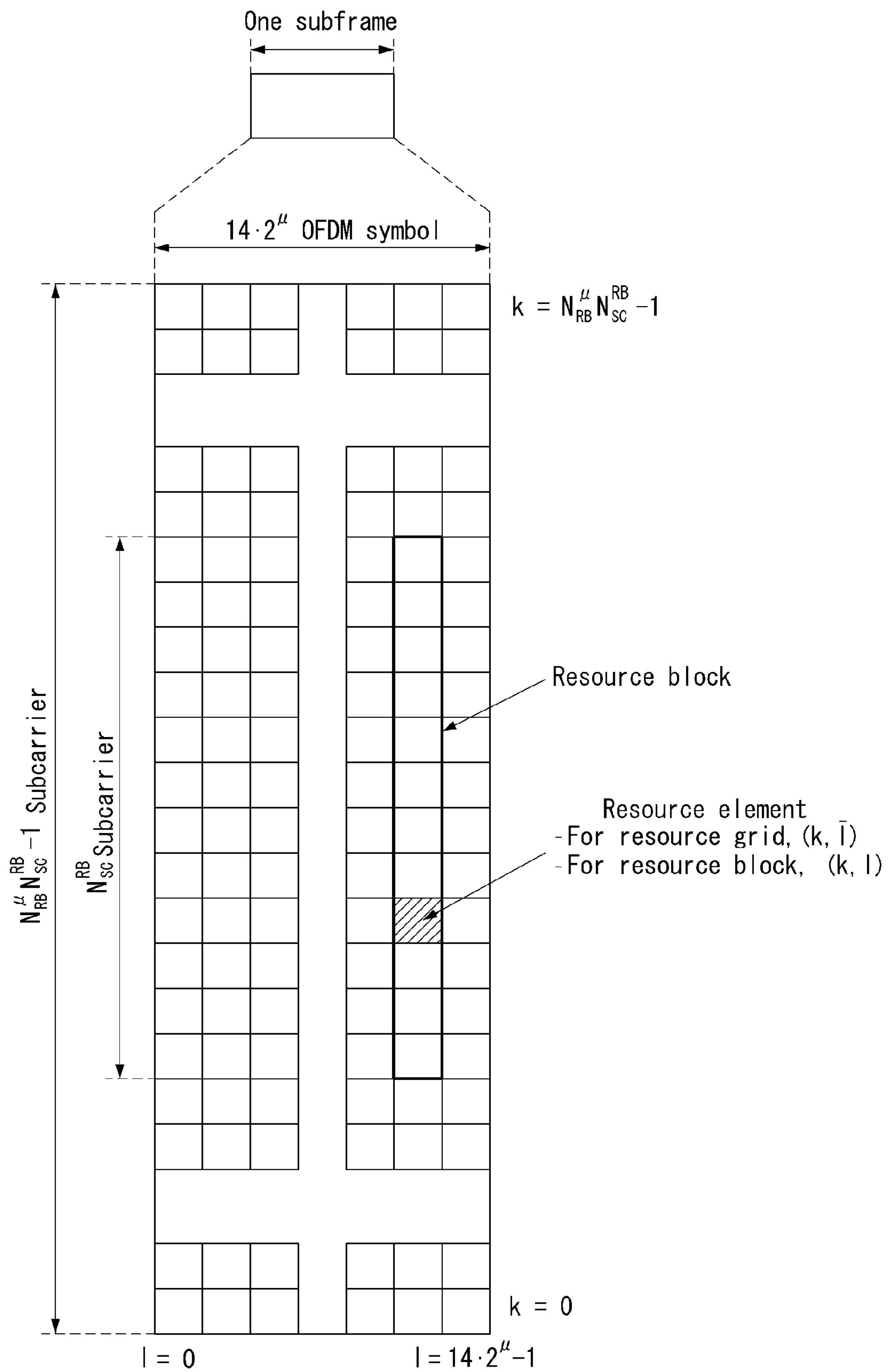
FIG. 3 illustrates an example of a resource grid supported in a wireless communication system to which the method proposed in the present disclosure may be applied.

FIG. 3 illustrates an example of a resource grid supported in a wireless communication system to which the method proposed in the present disclosure may be applied.

Referring to FIG. 3, it is described as an example that a resource grid includes $N_{RB}^{\mu}N_{sc}^{RB}$ subcarriers on a frequency domain, and a subframe includes 14·2μ OFDM symbols, but is not limited thereto.

In an NR system, a transmitted signal is described by one or more resource grids including $N_{RB}^{\mu}N_{sc}^{RB}$ subcarriers and $2^{\mu}N_{symb}^{(\mu)}$ OFDM symbols. Herein, $N_{RB}^{\mu} \le N_{RB}^{max,\mu}$. The $N_{RB}^{max,\mu}$ represents a maximum transmission bandwidth, and this may be changed between uplink and downlink, as well as numerologies.

Figure 4:
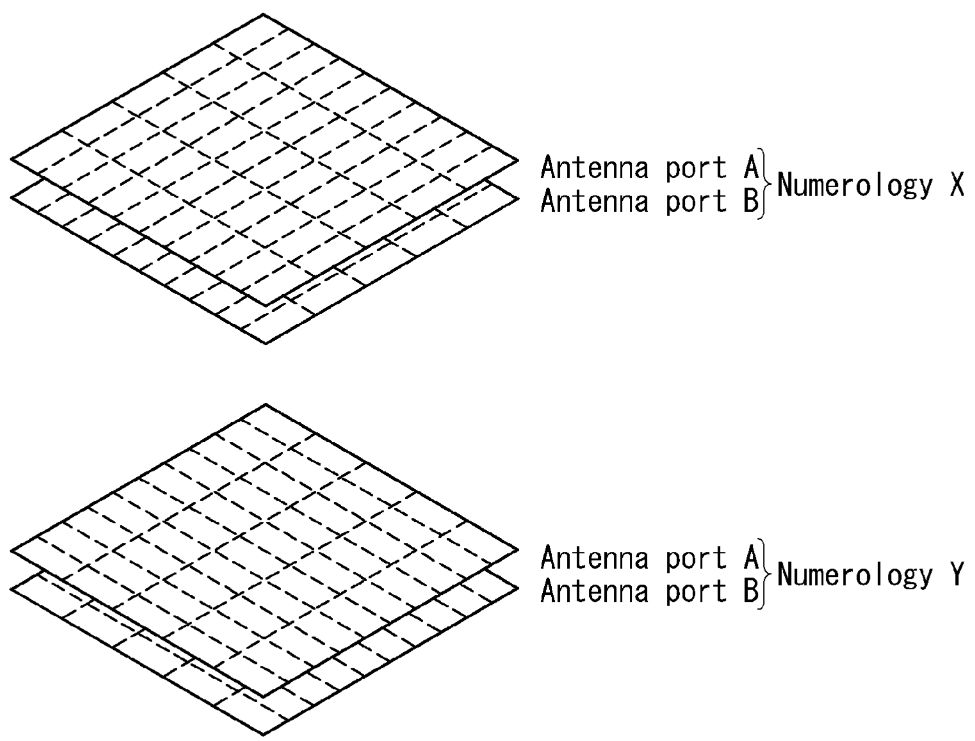
FIG. 4 illustrates examples of an antenna port and a resource grid for numerology to which the method proposed in the present disclosure may be applied.

In this case, as shown in FIG. 4, a single resource grid may be configured for each numerology μ and antenna port p.

FIG. 4 illustrates examples of an antenna port and a resource grid for numerology to which the method proposed in the present disclosure may be applied.

Each element of a resource grid for each numerology μ and antenna port p is referred to as a resource element, and uniquely distinguished by an index pair $(k, \bar{l})$. Herein, it is referred that $k=0, \ldots, N_{RB}^{\mu}N_{sc}^{RB}-1$ is an index on a frequency domain, and $\bar{l}=0, \ldots, 2^{\mu}N_{symb}^{(\mu)}-1$ is a position of a symbol in a subframe. Index pair $(k, \bar{l})$ is used for designating a resource element in a slot. Herein, $l=0, \ldots, N_{symb}^{\mu}-1$.

Resource element $(k, \bar{l})$ for numerology μ and antenna port p corresponds to a complex value $a_{k,\bar{l}}^{(p,\mu)}$. In the case that there is no risk of confusion or in the case that a specific antenna port or numerology is not specified, indexes p and μ may be dropped, and as a result, the complex value may become $a_{k,\bar{l}}^{(p)}$ or $a_{k,\bar{l}}$.

In addition, a physical resource block is defined by $N_{sc}^{RB}=12$ consecutive subcarriers in a frequency domain. On a frequency domain, numbers of 0 to $N_{RB}^{\mu}-1$ are designated to physical resources. At this time, the relation between physical resource block number $n_{PRB}$ and resource elements (k,l) are given by Equation 1.

$$n_{PRB} = \left\lfloor \frac{k}{N_{sc}^{RB}} \right\rfloor \qquad \text{[Equation 1]}$$

In addition, with respect to a carrier part, a UE may be configured to receive or transmit using a subset of a resource grid only. At this time, numbers of 0 to $N_{URB}^{\mu}-1$ are designated to a set of a resource block configured to receive or transmit by a UE on a frequency domain.

Uplink Control Channel

A physical uplink control signaling should be able to carry at least hybrid-ARQ acknowledgement, CSI report (including beamforming information, if it is available), and scheduling request.

At least two transmission methods are supported for UL control channel supported in an NR system.

UL control channel may be transmitted in a short duration around UL symbol(s) transmitted lastly in a slot. In this case, the UL control channel is time-division-multiplexed and/or frequency-division-multiplexed with a UL data channel in a slot. With respect to the short duration UL control channel, a transmission of 1 symbol unit is supported in a slot.

Short uplink Control Information (UCI) and data are frequency-division-multiplexed in a UE or between UEs so long as short UCI and Physical Resource Block (PRB) for data are not overlapped.

In order to support Time Division Multiplexing (TDM) of short PUCCH from different UEs in a same slot, a mechanism is supported for indicating whether symbol(s) in a slot to transmit the short PUCCH is supported in 6 GHz or higher to a UE.

With respect to 1-symbol duration, at least one of the followings are supported: 1) when a Reference Signal (RS) is multiplexed, the fact that UCI and RS are multiplexed in an OFDM symbol given in Frequency Division Multiplexing (FDM) scheme and 2) the fact that subcarrier spacing is the same between DL/UL data and the short duration PUCCH in a same slot.

At least, a short PUCCH throughout 2-symbol durations in a slot is supported. At this time, in the same slot, subcarrier spacing between DL/UL data and the short duration PUCCH is the same.

At least, it is supported a PUCCH resource of a given UE in a slot, that is, short PUCCHs in different UE support a semi-static configuration that may be time-division-multiplexed in a given duration in a slot.

A PUCCH resource includes a time domain, a frequency domain, and a code domain, if it is applicable.

A PUCCH of short duration may be extended to an end of a slot in a UE aspect. At this time, an explicit gap symbol is not required after the PUCCH of short duration.

With respect to a slot (i.e., DL-centric slot) having a short UL part, when data is scheduled in the short UL part, 'short UCI' and data may be frequency-division-multiplexed by a single UE.

A UL control channel may be transmitted in a long-duration throughout multiple UL symbols in order to improve coverage. In this case, the UL control channel is frequency-division-multiplexed with UL data channel in a slot.

Due to a design of which Peak to Average Power Ratio (PAPR) is low, at least, the UCI carried by a long duration UL control channel may be transmitted in a slot or multiple slots.

A transmission using multiple slots is allowed during total duration (e.g., 1 ms) for at least a part of a case.

In the case of a long duration UL control channel, a time division multiplexing (TDM) between RS and UCI is supported by DFT-S-OFDM.

A long UL part of a slot may be used for a long duration PUCCH transmission. That is, a long duration PUCCH is supported for both of UL-only slot and slot having symbols of variable numbers including minimum four symbols.

With respect to at least 1 or 2 bits UCI, the UCI may be repeated in N slots (N>1), and the N slots may be contiguous or not contiguous in slots in which long duration PUCCH is allowed.

With respect to at least long PUCCH, a simultaneous transmission of PUSCH and PUCCH is supported. That is, even in the case that data is existed, UL control for PUCCH resource is transmitted. In addition, UCI in PUSCH is supported in addition to PUCCH-PUSCH simultaneous transmission.

Intra-TTI slot frequency hopping in a TTI is supported.

DFT-s-OFDM waveform is supported.

Transmit antenna diversity is supported.

TDM and FDM between short duration PUCCH and long duration PUCCH is supported by different UEs in at least one slot. In a frequency domain, a PRB (or multiple PRBs) has a minimum resource unit size for UL control channel. In the case that hopping is used, a frequency resource and hopping may be spread into carrier bandwidth. In addition, a UE-specific RS is used for NR-PUCCH transmission. A set of PUCCH resources is configured by a higher layer signaling, and a PUCCH resource in the configured set is indicated by Downlink Control Information (DCI).

As a part of the DCI, timing between a data reception and hybrid-ARQ acknowledgement transmission should be indicated dynamically (together with at least RRC). Combination of semi-static configuration and dynamic signaling (for at least a type of UCI information) is used for determining a PUCCH resource for 'long and short PUCCH format'. Here, the PUCCH resource includes a time domain, a frequency domain, and a code domain if it is applicable. UCI on PUSCH, that is, use of a part of scheduled resource for UCI is supported in the case of a simultaneous transmission of UCI and data.

Furthermore, at least a UL transmission of at least single HARQ-ACK bit is supported. In addition, a mechanism that enables frequency diversity is supported. Furthermore, in the case of Ultra-Reliable and Low-Latency Communication (URLLC), a time interval between scheduling request (SR) resources configured for a UE may be smaller than a slot.

Beam Management

In NR, a beam management is defined as below.

Beam management: A set of L1/L2 procedures for obtaining and maintaining TRP(s) that may be used in DL and UL transmission/reception and/or a set of UE beams, includes at least the following factors:

- Beam determination: An operation that TRP(s) or UE selects transmission/reception beam
- Beam measurement: An operation that TRP(s) or UE measures the property of received beam formed signal
- Beam report: An operation that a UE report information of a beam formed signal based on a beam measurement
- Beam sweeping: An operation of covering a space area by using a beam transmitted and/or received during a time interval in a predetermined scheme In addition, Tx/Rx beam correspondence in TRP and UE is defined as below.

- Tx/Rx beam correspondence in TRP is maintained when at least one of the followings is satisfied.
- A TRP may determine TRP reception beam for receiving uplink based on a downlink measurement of a UE for one or more transmission beams.
- A TRP may determine TRP Tx beam for a downlink transmission based on an uplink measurement of a TRP for one or more Rx beams.
- Tx/Rx beam correspondence in UE is maintained when at least one of the followings is satisfied.
- A UE may determine UE Tx beam for an uplink transmission based on a downlink measurement of a UE for one or more Rx beams.
- A UE may determine UE reception beam for a downlink reception based on an indication of a TRP based on an uplink measurement for one or more Tx beams.
- Capability indication of information in relation to UE beam correspondence to a TRP is supported.

The following DL L1/L2 beam management procedure is supported in one or multiple TRPs.

P-1: This is used for enabling a UE measurement for different TRP Tx beams for supporting TRP Tx beam/UE Rx beam(s).

- Beamforming in a TRP includes intra/inter-TRP Tx beam sweep in different beam sets, generally. Beamforming in a UE includes UE Rx beam sweep from a set of different beams, commonly.

P-2: UE measurement for different TRP Tx beams is used for changing intra/inter-TRP Tx beam(s).

P-3: In the case that a UE uses beamforming, a UE measurement for the same TRP Tx beam is used for changing UE Rx beam.

At least aperiodic reporting triggered by a network is supported in the operation in relation to P-1, P-2 and P-3.

A UE measurement based on a RS for beam management (at least CSI-RS) includes K (total number of beams) beams, and a UE reports a measurement result of selected N Tx beams. Here, N is not necessarily a fixed number. The procedure based on an RS for mobility purpose is not excluded. Report information includes at least an amount of measurement for N beam(s) and information indicating N DL transmission beams when N<K. Particularly, with respect to K'>1 non-zero-power (NZP) CSI-RS resources, a UE may report N' CSI-RS resource indicators (CRIs).

A UE may be configured by higher layer parameters as below for beam management.

- N≥1 report setting, M≥1 resource setting
- The links between the report setting and the resource setting is set in an agreed CIS measurement setting.
- P-1 and P-2 based on CSI-RS are supported by a resource and report setting.
- P-3 may be supported regardless of report setting.
- Reporting setting including at least one factor below
- Information indicating a selected beam
- L1 measurement reporting
- Time domain operation (e.g., aperiodic operation, a periodic operation, a semi-persistent operation)
- Frequency granularity in the case that several frequency granularities are supported.
- Resource setting including at least one of following factors
- Time domain operation (e.g., aperiodic operation, a periodic operation, a semi-persistent operation)
- RS type: at least NZP CSI-RS
- At least one CSI-RS resource set. Each CSI-RS resource set includes K≥1 CSI-RS resources (A part of parameters of K CSI-RS resources may be identical. For example, a port number, a time domain operation, a density and a period)

In addition, NR supports the following beam report considering L group of L>1.

- Information indicating a minimum group
- Measurement quantity for N1 beam (support L1 RSRP and CSI report (in the case that CSI-RS is for obtaining CSI)
- If it is applicable, information indicating N1 DL transmission beams The group-based beam report described above may be configured in a unit of UE. In addition, the group-based beam report may be turned off in a unit of UE (e.g., in the case of L=1 or N1=1).

NR supports that a UE may trigger a mechanism for recovering from beam failure.

A beam failure event occurs when a quality of beam pair link of an associated control channel is low enough (e.g., comparison with a threshold value, a timeout of an associated timer). The mechanism for recovering from beam failure (or malfunction) is triggered when the beam malfunction occurs.

A network explicitly configures a UE that has a resource for transmitting a UL signal for recovery purpose. A configuration of resources is supported in a place that an eNB listens from the whole or a part of direction (e.g., random access region).

UL transmission/resource for reporting the beam malfunction may be positioned on a time instance the same as PRACH (resource orthogonal to PRACH resource) or on a time instance (configurable by a UE) different from PRACH. A transmission of DL signal is supported such that a UE may monitor a beam for distinguishing a new potential beams.

NR supports a beam management without regard to a beam-related indication. In the case that the beam-related indication is provided, the information of UE-side beamforming/reception procedure used for CSI-RS based measurement may be indicated by a UE through QCL. As the QCL parameter going to be supported in NR, spatial parameter for beamforming in a receiving end as well as the parameters for delay, Doppler, average gain, and the like are supposed to be added, and parameters in relation to angle of arrival in a UE reception beamforming aspect and/or parameters in relation to angle of departure in an eNB reception beamforming aspect may be included. NR supports the technique of using the same or different beam in a transmission of a control channel and the corresponding data channel.

For NR-PDCCH transmission that supports robustness for beam pair link blocking, a UE may be configured to monitor NR-PDCCH in M beam pair links simultaneously. Here, a maximum value of M (M≥1) may be dependent upon at least UE capability.

A UE may be configured to monitor NR-PDCCH on different beam pair link(s) in different NR-PDCCH OFDM symbols. A UE Rx beam setting and the related parameter for monitoring NR-PDCCH on multiple beam pair links may be setup by a higher layer signaling or an MAC CE and/or considered in a search space design.

At least, NR supports an indication of spatial QCL assumption between DL RS antenna port(s) and DL RS antenna port(s) for demodulating a DL control channel. A candidate signaling method for a beam direction for NR-PDCCH (i.e., a configuration method for monitoring NR-PDCCH) is MAC CE signaling method, RRC signaling method, DCI signaling method, spec transparent method and/or implicit method, and a combination of these signaling methods.

In order to receive a unicast DL data channel, NR supports an indicating of spatial QCL assumption between DL RS antenna port and DMRS antenna port of DL data channel.

The information indicating an RS antenna port is represented through DCI (downlink permission). In addition, this information represents an RS antenna port which is in QCL with DMRS antenna port. Different set of DMRS antenna port for a DL data channel may be represent as QCL with other set of RS antenna port.

Hereinafter, before describing the methods proposed in the present disclosure in detail, the contents directly/indirectly related to the methods proposed in the present disclosure are described briefly, first.

In a next generation communication such as 5G, New Rat (NR), and the like, more communication devices require greater communication capacity, and accordingly, a necessity of mobile broadband communication more improved than the existing radio access technology (RAT) has been raised.

In addition, the massive MTC (Machine Type Communications) that provides various services anytime and anywhere by connecting a plurality of devices and objects is also one of important issues, which is considered in a next generation communication.

Moreover, it has been discussed a design or a structure of a communication system in which a service and/or a UE sensitive to reliability and latency.

As such, an introduction of a next generation radio access technology (RAT) has been discussed currently, which considers enhanced mobile broadband (eMBB) communication, massive MTC (mMTC), Ultra-Reliable and Low Latency Communication (URLLC), and the like, and the corresponding technology is referred to as 'new RAT (NR)' in the present disclosure for the convenience of description.

OFDM Numerology in NR

The New RAT system uses OFDM transmission technique or the similar transmission technique, and has OFDM numerology as shown in Table 4 below.

That is, Table 4 represents an example of OFDM parameters in the New RAT system.

TABLE 4

| Parameter | Value |
|---|---|
| Subcarrier-spacing (Δf) | 60 kHz |
| OFDM symbol length | 16.33 us |
| Cyclic Prefix(CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

Analog Beamforming

In Millimeter Wave (mmW) band, a wavelength becomes short and an installation of a plurality of antenna elements is available in the same area.

That is, the wavelength in 30 GHz band is 1 cm, and accordingly, an installation of total 64 (8×8) antenna elements is available in 2-dimensional arrangement shape with 0.5 lambda (wavelength) interval in 4×4 cm panel.

Therefore, in mmW band, beamforming (BF) gain is increased by using a plurality of antenna elements, and accordingly, coverage is increased or throughput is higher.

In this case, each antenna element has a Transceiver Unit (TXRU) such that it is available to adjust a transmission power and a phase, and independent beamforming is available for each frequency resource.

However, it has a problem that effectiveness is degraded in a cost aspect when TXRUs are installed in all of about 100 antenna elements.

Accordingly, a method has been considered to map a plurality of antenna elements in a single TXRU and to adjust a direction of beam by an analog phase shifter.

Such an analog beamforming technique may make only one beam direction throughout the entire band, and there is a disadvantage that frequency selective beamforming is not available.

Due to such a reason, B number of hybrid BF (HBF) may be considered which is smaller than Q number of antenna element, as a middle form between a Digital BF and an analog BF.

In the HBF, directions of beams that may be transmitted simultaneously are limited lower than B number; even it is changed according to a connection scheme between B number of TXRUs and Q number of antenna elements.

Figure 5A:
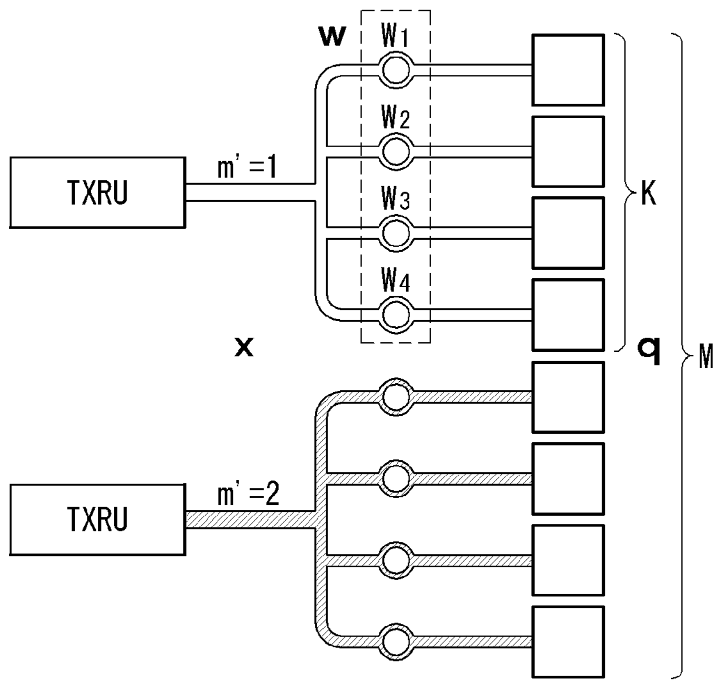
FIGS. 5A and 5B illustrate examples of a connection scheme between a TXRU and an antenna element.
Figure 5B:
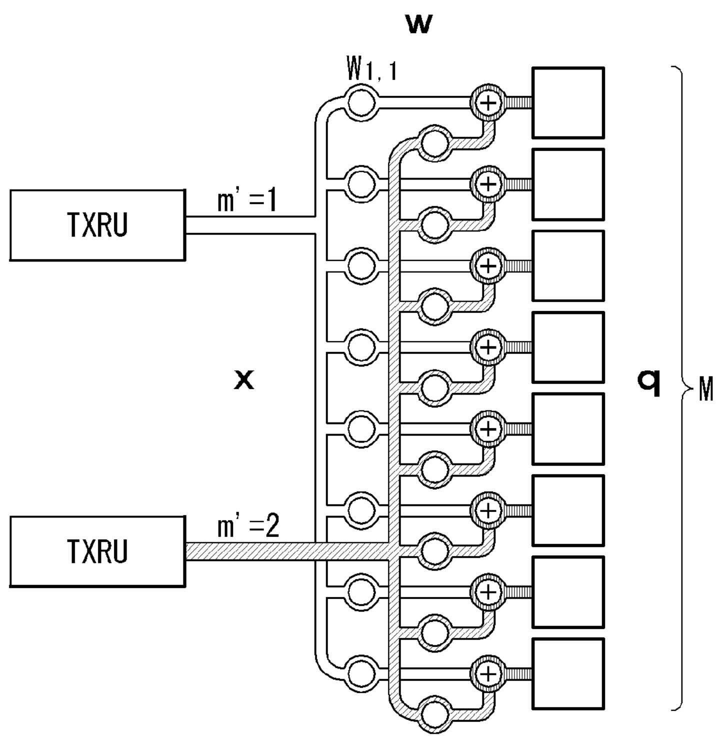

FIGS. 5A and 5B illustrate examples of a connection scheme between a TXRU and an antenna element.

Here, TXRU virtualization model represents a relation between an output signal of a TXRU and an output signal of an antenna element.

FIG. 5A shows an example of a scheme in which a TXRU is connected to sub-array.

Referring to FIG. 5A, an antenna element is connected to only a single TXRU. Different from FIG. 5A, FIG. 5B shows a scheme in which a TXRU is connected to all antenna elements.

That is, in the case of FIG. 5B, an antenna element is connected to all TXRUs.

In FIGS. 5A and 5B, W represents a phase vector which is multiplied by an analog phase shifter.

That is, a direction of analog beamforming is determined by W. Here, mapping between CSI-RS antenna ports and TXRUs may be 1-to-1 or 1-to-many.

RS Virtualization

In mmW band, a PDSCH transmission is available only to a single analog beam direction on a time by analog beamforming.

Therefore, an eNB transmits data only to a small number of UEs in a specific direction.

Accordingly, on occasion demands, analog beam direction is differently configured for each antenna port, and a data transmission may be performed to a plurality of UEs in several analog beam directions simultaneously.

Figure 6A:
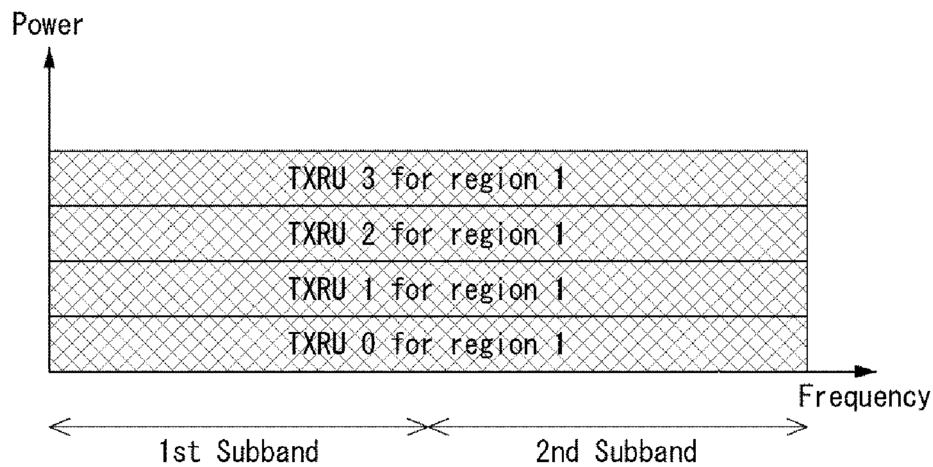
FIGS. 6A through 6C illustrate various examples of a service area for each TXRU.
Figure 6B:
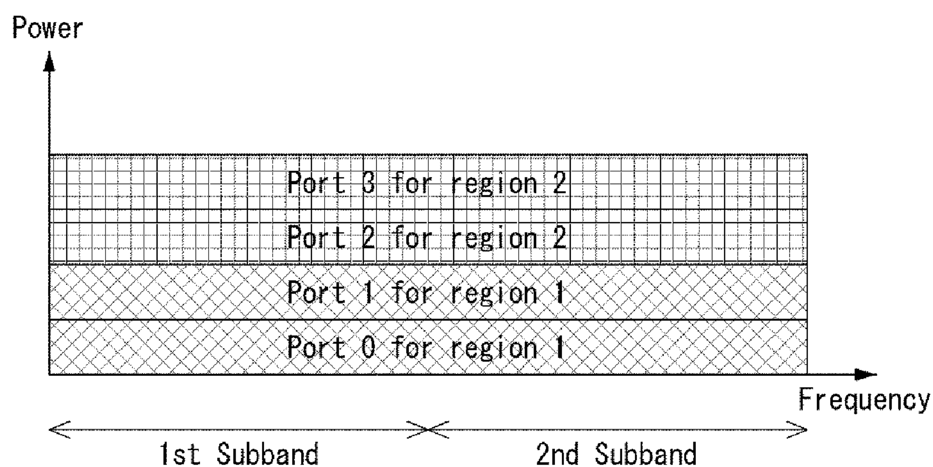
Figure 6C:
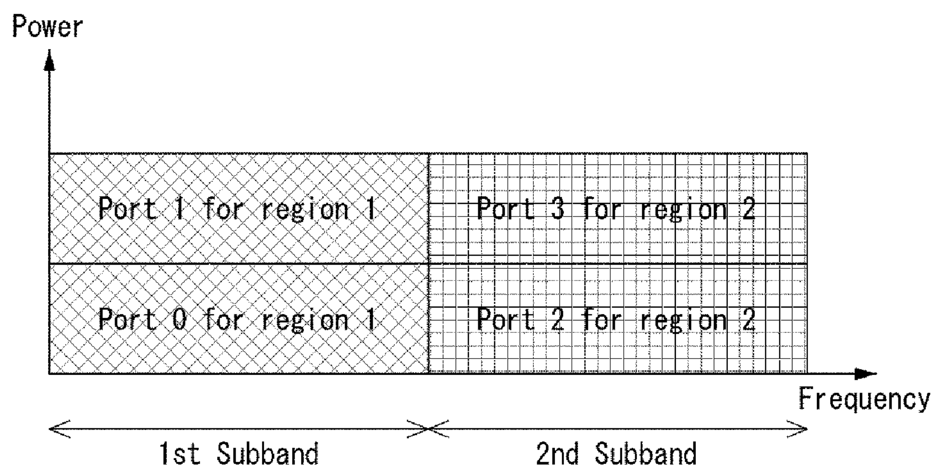

FIGS. 6A through 6C illustrate various examples of a service area for each TXRU.

FIGS. 6A through 6C relate to a structure in which four sub-arrays are formed by dividing 256 antenna elements into four equal parts and a TXRU is connected to each sub-array, and this is described as an example.

When each sub-array includes total 64 (8×8) antenna elements in 2-dimensional array shape, a region corresponding to a horizontal angle area of 15 degrees and a vertical angle area of 15 degrees may be covered by specific beamforming.

That is, a region in which an eNB is needed to serve is divided into a plurality of areas, and each area is served at a time.

In the following description, it is assumed that CSI-RS antenna port and TXRU are mapped in 1-to-1 manner.

Accordingly, an antenna port and a TXRU may be interpreted to have the same meaning in the following description.

As shown in FIG. 6A, in the case that all TXRUs (antenna port, sub-array) have the same analog beamforming direction, the throughput of the corresponding region may be increased by forming a digital beam having higher resolution.

In addition, the throughput of the corresponding region may be increased by increasing rank of transmission data to the corresponding region.

Furthermore, as shown in FIG. 6B, in the case that each TXRU (antenna port, sub-array) has different analog beamforming direction, a simultaneous data transmission becomes available in a corresponding subframe (SF) to UEs distributed in wider area.

As shown in FIG. 6B, among four antenna ports, two of them are used for a PDSCH transmission to UE1 in area 1 and the remaining two of them are used for a PDSCH transmission to UE2 in area 2.

In addition, FIG. 6B shows an example that PDSCH 1 transmitted to UE1 and PDSCH 2 transmitted to UE2 are Spatial Division Multiplexed (SDM).

Different from this, as shown in FIG. 6C, PDSCH 1 transmitted to UE1 and PDSCH 2 transmitted to UE2 may be transmitted by being Frequency Division Multiplexed (FDM).

Between the scheme of serving an area by using all antenna ports and the scheme of serving several areas simultaneously by dividing antenna ports, in order to maximize cell throughput, a preferred scheme may be changed depending on a RANK and an MCS served to a UE.

In addition, a preferred scheme may also be changed depending on an amount of data to be transmitted to each UE.

An eNB calculates cell throughput or scheduling metric that may be obtained when serving an area by using all antenna ports, and calculates cell throughput or scheduling metric that may be obtained when serving two areas by dividing antenna ports.

The eNB compares the cell throughput or the scheduling metric that may be obtained through each scheme, and selects a final transmission scheme.

Consequently, the number of antenna ports participated in a PDSCH transmission is changed SF-by-SF.

In order for an eNB to calculate a transmission MCS of a PDSCH according to the number of antenna ports and reflect it to scheduling algorithm, a CSI feedback from a UE proper to it is requested.

CSI Feedback

In a 3GPP LTE(-A) system, it is defined that a UE reports channel state information (CSI) to a BS.

Here, CSI refers to information indicating quality of a radio channel (or referred to as a 'link') formed between the UE and an antenna port.

For example, the CSI includes a rank indicator (RI), a precoding matrix indicator (PMI), a channel quality indicator (CQI), etc.

Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI.

The PMI is a value in which a channel space property is reflected and indicates a precoding index preferred by the UE based on a metric such a signal to interference plus noise ratio (SINR).

The CQI indicates the strength of the channel and means a reception SINR obtained when the BS uses the PMI.

In 3GPP LTE(-A) system, a BS may configure a plurality of CSI processes to a UE, and may receive a report of CSI for each process.

Here, the CSI process includes CSI-RS for signal quality measurement from the BS and CSI-interference measurement (CSI-IM) resource for measuring interference.

Tx-Rx Beam Association

A network may transmit a known signal (e.g., includes measurement reference signal (MRS), beam reference signal (BRS), beamformed channel state information reference signal (CSI-RS), and the like, and hereinafter, this is commonly referred to as 'BRS' for the convenience of description) to which each beam is applied in order for a UE to perform a measurement for the beams that are intended to be used in a corresponding cell (or used by an eNB).

In addition, a UE may select an eNB Tx beam proper to the UE through a measurement of BRS.

Even In the case of considering an Rx beam of a UE, the UE may perform a measurement by using different Rx beams, and may select beam combination(s) considering a Tx beam of an eNB and the Rx beam of the UE.

After such a procedure is performed, Tx-Rx beam association of the eNB and the UE may be determined explicitly or implicitly.

(1) Network Decision Based Beam Association

A network may instruct to report upper X Tx-Rx beam combinations as a result of measurement. At this time, the number of beam combinations to report may be predefined, signaled by a network (through higher layer signaling, etc.), or all of the beam combination that exceeds a specific threshold may be reported.

At this time, the specific threshold may be predefined or signaled by a network, and in the case that decoding performance is different for each UE, a category considering decoding performance of a UE, and a threshold for each category may be defined.

In addition, a report for a beam combination may be performed by an instruction of a network periodically and/or aperiodically. Otherwise, in the case that there is a change of a predetermined level or more between a previous report result and a current measurement result, an event-triggered reporting may be performed. At this time, the predetermined level may be predefined or signaled by a network (through higher layer signaling, etc.).

A UE may report (a single or multiple) beam association(s) determined by the method described above. In the case that multiple beam indexes are reported, a priority for each beam may be provided. For example, the UE may report such that it is interpreted as a 1st preferred beam, a 2nd preferred beam, and so on.

(2) UE Decision Based Beam Association

In a UE decision based beam association, the preferred beam reporting of a UE may be performed in a scheme such as explicit beam association described above.

Rx Beam Assumption for the Measurement

Additionally, the best beam(s) that a UE report may be a measurement result when a single Rx beam is assumed or a plurality of Rx beams is assumed, and the assumption for an Rx beam may be configured by a network.

For example, in the case that a network instructs to report three measurement results when a single Rx beam is assumed, a UE may perform a measurement by using all Rx beams, and after selecting the best (eNB) Tx beam as a result of the measurement result, may report the $1^{st}$, $2^{nd}$ and $3^{rd}$ best results among the measurement results by the Rx beam used in the corresponding Tx beam measurement.

In addition, the reported measurement result may be limited to that of exceeding a specific threshold. For example, in the case that a beam of which measurement value exceeds a specific threshold (predefined or configured by a network) is only the $1^{st}$ best beam among the $1^{st}$, $2^{nd}$ and $3^{rd}$ best beams, the UE may report only the $1^{st}$ best beam to an eNB.

Quasi Co-Location (QCL)

When a UE receives data (e.g., PDSCH), a scheme is considered for demodulating the data using a UE-specific RS like a specific DMRS. Since such a DMRS is transmitted together with scheduled RB(s) of the corresponding PDSCH only and during only a time duration in which a scheduled PDSCH is transmitted, there may be a restriction in reception performance in performing channel estimation only with the corresponding DMRS.

For example, for performing channel estimation, an estimation value of major large-scale parameter (LSP) of a radio channel is required, and DMRS density may be in short to obtain only the DMRS existed in time/frequency domain through which the scheduled PDSCH is transmitted.

Accordingly, in order to support such a UE implementation, in LTE-A, the following quasi co-location signaling/assumption/behavior between RS ports is defined, and accordingly this, the methods of configuring/operating a UE are supported.

That is, in the case that a large-scale property of a channel through which a symbol on a single antenna port is transferred is able to be deducted by a channel through which a symbol on another antenna port, it is said that the two antenna ports are in quasi co-located (QCL) relation.

Here, the large-scale property includes one or more of delay spread, Doppler spread, Doppler shift, average gain and average delay.

In addition, a UE may assume antenna ports 0 to 3, and an antenna port for primary/secondary synchronization signal in serving cell is in QCL for Doppler shift and average delay.

Physical Downlink Shared Channel (PDSCH) Resource Mapping Parameters

A UE configured with transmission mode 10 for a given serving cell may be configured with up to four parameter sets by higher layer signaling in order to decode a PDSCH according to detected PDCCH/EPDCCH that has DCI format 2D which is intended for the UE and the given serving cell. In order for the UE to determine PDSCH RE mapping and to determine PDSCH antenna port QCL when the UE is configured with Type B QCL type, the UE uses the parameter configured according to 'PDSCH RE Mapping and Quasi-Co-Location indicator' field value in the detected PDCCH/EPDCCH that has DCI format 2D.

In the case of a PDSCH that has no corresponding PDCCH/EPDCCH, the UE uses the parameter set indicated in the PDCCH/EPDCCH that has DCI format 2D corresponding to SPS activation which is associated to determine PDSCH RE mapping and PDSCH antenna port QCL.

Table 5 below represents PDSCH RE Mapping and Quasi-Co-Location Indicator field in DCI format 2D.

TABLE 5

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port QCL are configured through higher layer signaling for each parameter set.

- crs-PortsCount-r11
- crs-FreqShift-r11
- mbsfn-SubframeConfigList-r11
- csi-RS-ConfigZPId-r11
- pdsch-Start-r11
- qcl-CSI-RS-ConfigNZPId-r11
- zeroTxPowerCSI-RS2-r12, when a UE is configured with higher layer parameter eMIMO-Type for a TDD serving cell Antenna Port QCL for PDSCH A UE configured with transmission modes 8-10 for a serving cell may assume that antenna ports 7-14 for the serving cell is in QCL for a given subframe for delay spread, Doppler spread, Doppler shift, average gain and average delay.

A UE configured with transmission modes 1-10 for a serving cell may assume that antenna ports 0-3, 5, 7-30 for the serving cell is in QCL for Doppler shift, Doppler spread, average delay and delay spread.

A UE configured with transmission mode 10 for a serving cell is configured with one of two QCL types for the serving cell by higher layer parameter QCL operation in order to decode a PDSCH according to a transmission scheme in relation to antenna ports 7-14.

Type A: A UE may assume that antenna ports 0-3, 7-30 of a serving cell is in QCL for delay spread, Doppler spread, Doppler shift and average delay.

Type B: A UE may assume that antenna ports 15-30 that corresponds to a CSI-RS resource configuration identified by higher layer parameter qcl-CSI-RS-ConfigNZPId-r11 and antenna ports 7-14 associated with a PDSCH is in QCL for Doppler shift, Doppler spread, average delay and delay spread.

In the case of LAA Scell, a UE does not expect that it is configured with QCL type B.

Channel-State Information-Reference Signal (CSI-RS) Definition

With respect to a serving cell and a UE that are configured with transmission mode 9 and not configured with higher layer parameter eMIMO-Type, the UE may be configured with a single CSI-RS resource configuration.

With respect to a serving cell and a UE that are configured with transmission mode 9, configured with higher layer parameter eMIMO-Type and of which eMIMO-Type is 'class A', the UE may be configured with a single CSI-RS resource configuration.

With respect to a serving cell and a UE that are configured with transmission mode 9, configured with higher layer parameter eMIMO-Type and of which eMIMO-Type is 'class B', the UE may be configured with one or more CSI-RS resource configurations.

With respect to a serving cell and a UE that are configured with transmission mode 10, the UE may be configured with one or more CSI-RS resource configuration(s). The following parameters that the UE assumes non-zero transmission power for a CSI-RS is configured through higher layer signaling for each CSI-RS resource configuration:

CSI-RS resource configuration identity when a UE is configured with transmission mode 10

The number of CSI-RS ports

CSI RS configuration

CSI RS subframe configuration $I_{CSI-RS}$

UE assumption for a reference PDSCH transmission power $P_c$ for CSI feedback, when a UE is configured with transmission mode 9

UE assumption for a reference PDSCH transmission power $P_c$ for CSI feedback for each CSI process, when a UE is configured with transmission mode 10

In the case that CSI subframe sets $C_{CSI,0}$ and $C_{CSI,1}$ are configured by higher layer signaling for a single CSI process, $P_c$ is configured for each of the CSI subframe sets of the corresponding CSI process.

Pseudo-random sequence generator parameter $n_{ID}$

CDM type parameter, when a UE is configured with higher layer parameter eMIMO-Type and the eMIMO-Type is set to 'class A'.

Higher layer parameter qcl-CRS-Info-r11CRS, when a UE is configured with transmission mode 10, UE assumption of CRS antenna port that has the following parameters and CSI-RS antenna ports:

qcl-ScramblingIdentity-r11.

crs-PortsCount-r11.

mbsfn-SubframeConfigList-r11.

$P_c$ is an assumed ratio of PDSCH EPRE for CSI-RS EPRE when a UE derives CSI feedback and takes a value in a range of [−8, 15] dB with 1 dB step size.

Here, the PDSCH EPRE corresponds to symbols in which a ratio between the PDSCH EPRE and cell-specific RS EPRE is represented as $\rho_A$.

A UE does not expect configuration of CSI-RS and PMCH in the same subframe of a serving cell.

With respect to frame structure type 2 serving cell and 4 CRS ports, a UE does not expect to receive CSI-RS configuration index belonged to set [20-31] for a normal CP case or set [16-27] for an extended CP case.

A UE may assume that CSI-RS antenna port of CSI-RS resource configuration is in QCL for delay spread, Doppler spread, Doppler shift, average gain and average delay.

A UE configured with transmission mode 10 and QCL type B may assume that antenna ports 0 to 3 associated with qcl-CRS-Info-ill corresponding to CSI-RS resource configuration and antenna ports 15 to 30 corresponding to CSI-RS resource configuration are in QCL for Doppler shift and Doppler spread.

A UE configured with transmission 10, configured with higher layer parameter eMIMO-Type and the eMIMO-Type is set to 'class B', in which the number of configured CSI resources is more than one for a single CSI process and having QCL type B does not expect to receive CSI-RS resource configuration for a CSI process that has different value of higher layer parameter qcl-CRS-Info-r11.

BL/CE UE configured with CEModeA or CEModeB does not expect that it is configured with non-zero transmission power CSI-RS.

Assumptions Independent of Physical Channel

A UE does not assume that two antenna ports are in QCL unless otherwise specified.

A UE may assume that antenna ports 0 to 3 for a serving cell is in QCL for delay spread, Doppler spread, Doppler shift, average gain and average delay.

For the purpose of discovery signal-based measurement, a UE does not assume that there is another signal or physical channel except the discovery signal.

In the case that a UE supports discoverySignalsInDeactSCell-r12, the UE is configured by discovery signal-based RRM measurement in a carrier frequency applicable to a secondary cell in the same carrier frequency, the secondary cell is inactivated, and the UE is not configured by higher layer in order to receive MBMS in the secondary cell, except a discovery signal transmission, PSS, SSS, PBCH, CRS, PCFICH, PDSCH, PDCCH, EPDCCH, PHICH, DMRS and CSI-RS are not transmitted by the corresponding secondary cell until the subframe in which an activation command is received for the secondary cell.

In the operation described above, for example, in the case of a UE configured with QCL Type B, in order to be assisted with channel estimation of a DMRS transmitted together with scheduled PDSCH, the UE is restricted to be able to use LSPs estimated from a specific QCLed CSI-RS resource indicated in the corresponding scheduled DCI.

However, in the New RAT (NR) environment considered in the present disclosure, aperiodic CSI-RS transmission scheme is considered in the aspect that the transmission of CSI-RS itself is transmitted only when it is required departing from the conventional periodic scheme, and accordingly, there is a problem that the RS density for utilizing QCL CSI-RS becomes in short significantly in comparison with the conventional case.

As QCL parameters considered in the NR environment, one of the followings may be defined/configured.

Delay spread

Doppler spread

Doppler shift

Average gain

Average delay

Average angle (AA):

Between antenna ports in which QCL is guaranteed in AA aspect, for example, it may be available to setup reception beam directions (and/or reception beam widths/sweeping degrees) identically or similarly (in relation to it) when it is intended to received a transmission signal from other antenna port(s) based on AA estimated from specific antenna port(s) and receive and process it (this means that a reception performance is guaranteed higher than a specific level when operating as such).

AA may also be represented as a term like "(Almost) Dominant arrival angle", for example.

Consequently, when assuming that there is a specific dominant (arrived) angle S of a signal measured from a specific antenna port, it has a meaning that the specific dominant (arrived) angle of a signal measured from other antenna port, which is available to set QCL assumption with this, is "almost" similar.

That is, in the case that such a QCL assumption is available, it has a meaning that a receiver may utilize/apply the AA estimated from the specific indicated QCLed RS/SS to a reception process almost at it is, and accordingly, there is an advantage that an implementation/operation of an efficient receiver is available.

Angular spread (AS):

QCL in the AS aspect between two antenna ports means that the AS estimated from one port may be derived, estimated or applied from the AS estimated from other port.

In this case, the AS is Azimuth and/or Zenith AS, and may be separately defined for each specific dimension or defined together, and in addition, may be defined separately or together with in departure and/or arrival aspect.

Between antenna ports in which QCL is guaranteed in AA aspect, for example, it may be available to setup reception beam widths/sweeping degrees (and/or reception beam direction) identically or similarly (in relation to it) when it is intended to received a transmission signal from other antenna port(s) based on AS estimated from specific antenna port(s) and receive and process it (this means that a reception performance is guaranteed higher than a specific level when operating as such).

That is, in the case that the AA has a property meaning average, (the most) valid/dominant beam direction, the AS may be interpreted as a parameter for degree of spreading of beam direction by a reflector distribution in reception (based on AA/AA in the center).

Beam Management and Beam Failure Recovery

An eNB may request a periodic report, a semi-persistent CSI report (a periodic CSI report is activated only in a specific time duration or consecutive a plurality of CSI reports is performed) or aperiodic CSI report to a UE.

Here, in the periodic and semi-persistent (SP) CSI reporting, a uplink (UL) resource (e.g., PUCCH in LTE) for a CSI report is allocated to a UE with a specific period during a term in which a report is activated.

For a CSI measurement of a UE, a transmission of downlink (DL) reference signal (RS) of an eNB is required.

In the case of a beamformed system to which (analogue) beamforming is applied, it is required to determine DL transmission (Tx)/reception (Rx) beam pair for the DL RS transmission/reception and UL Tx/Rx beam pair for uplink control information (UCI, e.g., CSI, ACK/NACK) transmission/reception.

A procedure for determining DL beam pair includes a combination of (1) a process that an eNB transmits a DL RS corresponding to a plurality of TRP Tx beams to a UE, (2) TRP Tx beam selection process that the UE selects and/or reports one of these, (3) a process that an eNB repeatedly transmits the same RS signal corresponding to each TRP Tx beam, and (4) a process that the UE measures with different UE Rx beams for the repeatedly transmitted signals and selects a UE Rx beam.

In addition, a procedure for determining UL beam pair includes a combination of (1) a process that a UE transmits a UL RS corresponding to a plurality of UE Tx beams to an eNB, (2) UE Tx beam selection process that an eNB selects and/or signals one of these, (3) a process that the UE repeatedly transmits the same RS signal corresponding to each UE Tx beam, and (4) a process that the eNB measures with different TRP Rx beams for the repeatedly transmitted signals and selects a TRP Rx beam.

In the case that a beam reciprocity (or beam correspondence) is established, that is, in the case that an eNB DL Tx beam and an eNB UL Rx beam are identical in a communication between an eNB and a UE, and it is assumed that a UE UL Tx beam and a UE DL Rx beam are identical, when either one of DL beam pair and UL beam pair is determined, a process of determining the other one may be omitted.

A process of determining DL and/or UL beam pair may be performed periodically or aperiodically.

In the case that there are many candidate number of beams, a required RS overhead may be great, and accordingly, it is not preferable that a determination process for the DL and/or UL beam pair occurs frequently.

After the determination process for the DL/UL beam pair, it is assumed that a UE performs periodic or semi-persistent CSI reporting.

Here, the CSI-RS that includes one or a plurality of antenna ports for CSI measurement may be transmitted by being beamformed with the TRP Tx beam determined as a DL beam, and a transmission period of CSI-RS may be the same as CSI reporting period or the CSI-RS may be transmitted more frequently.

Otherwise, it is also available that a UE transmits aperiodic CSI-RS in accordance with CSI reporting period or more frequently.

A UE may transmit the measured CSI information with a UL Tx beam predetermined in the process of determining UL beam pair periodically.

When DL/UL beam management process is performed, a beam mismatch problem may occur according to a beam management which is period configured.

Particularly, in the case that a radio channel environment is changed owing to a position change of a UE, a rotation of a UE or a movement of an object around the UE (e.g., Line-of-Sight (LoS) environment is changed to Non-LoS environment since a beam is blocked, an optimal DL/UL beam pair may be changed.

Such a change may be referred to an occurrence of beam failure event when tracking is failed due to beam management process which is performed by a network instruction, generally.

A UE may determine whether such beam failure even is occurred through a reception quality of a downlink RS, and a reporting message for such a situation or a message for a beam recovery request (hereinafter, defined as 'beam recovery request message') should be forwarded from the UE.

Such a 'beam recovery request message' may be represented by various manners such as a beam failure recovery request message, a control signal, a control message, a first message, and so on.

The eNB that receives the beam recovery request message from the UE may perform a beam recovery through various processes such as a beam RS transmission to the UE, a beam reporting request, and so on.

Such a series of beam recovery process is referred to as 'beam recovery'.

In 3GPP, the standardization for a new communication system named by new radio or New Rat (NR) has been progressed after LTE, and the following contents are included in relation to beam management.

(Content 1)

NR supports availability for a UE of triggering a mechanism of recovering from a beam failure.

A network explicitly configures a resource for a UL transmission of signals to a UE for the purpose of recovery.

An eNB supports a configuration of resource listening from the entire or a part of directions (e.g., random access area).

(To be discussed later) Triggering condition of recovery signal (new or existing signal) in relation to a UE operation of RS/control channel/data channel monitoring A UE supports a DL signal transmission so as to monitor a beam in order to identify new potential beams.

(To be discussed later) A transmission of beam sweep control channel is not excluded.

This mechanism should consider tradeoff between performance and DL signaling overhead.

(Content 2)

Considering the following candidate solution as possible, beam management overhead and delay time should be considered during CSI-RS designing for NR beam management.

Opt1. IFDMA

Opt2. Large subcarrier spacing

Other aspects considered during CSI-RS designing for NR beam management includes CSI-RS multiplexing, UE beam switch latency and UE implementation complexity (e.g., AGC training time), CSI-RS coverage, and the like, for example.

(Content 3)

CSI-RS supports DL Tx beam sweeping and UE Rx beam sweeping.

NR CSI-RS supports the following mapping structure.

NP CSI-RS port may be mapped for each (sub) time unit.

Throughout (sub) time units, identical CSI-RS antenna ports may be mapped.

Here, "time unit" represent n>=1 OFDM symbol in configured/eference numerology.

Each time unit may be partitioned in sub-time unit.

This mapping structure may be used for supporting a plurality of panels/Tx chains.

(Option 1)

Tx beam(s) is(are) identical throughout sub-time unit in each time unit.

Tx beam(s) is(are) different depending on time unit.

(Option 2)

Tx beam(s) is(are) identical throughout sub-time unit in each time unit.

Tx beam(s) is(are) identical in time units.

(Option 3) Combination of Option 1 and Option 2

In a time unit, Tx beam(s) is(are) identical in sub-time units.

In different time units, Tx beam(s) is(are) different for each sub-time unit.

Hereinafter, it is briefly described a Beam failure recovery mechanism of a UE in relation to the methods proposed in the present disclosure.

The Beam failure recovery mechanism of the UE includes (1) to (4) procedures below.

(1) Detect a beam failure (2) Identify a new candidate beam (3) Transmit a beam failure recovery request (4) A UE monitors a response of gNB for the beam failure recovery request First, in describing a beam failure detection process, a UE monitors beam failure detection RS in order to evaluate whether a beam failure trigger condition is satisfied.

Further, the beam failure detection RS includes at least a periodic CSI-RS for beam management. Here, Synchronization Signal (SS) block may also be used for beam management, and in the case that the SS block is used for beam management, the SS block in a serving cell may be considered.

Here, the SS block may be interpreted that SS is transmitted in a slot unit or a specific time unit.

Here, the beam failure detection RS includes a case of measuring detection/demodulation quality of a radio channel associated with the corresponding RS by Quasi Co-Location (QCL) indicator, and so on, as well as a case of measuring the quality itself of the corresponding RS. For example, the CSI-RS indicated for a (primary) PDCCH monitoring or an ID in relation to the SS block may be understood as the beam failure detection RS, and in this case, it may be defined whether a beam failure event is occurred as a case that detection/demodulation performance of the corresponding PDCCH is lower than a predetermined value.

The beam failure even may occur when a quality of beam pair link(s) of an associated control channel is degraded under a predetermined level.

Particularly, the quality of beam pair link(s) of an associated control channel may be determined as PDCCH detection performance.

For example, in the case that the PDCCH detection performance is not good as a result of CRC check during monitoring (or blind decoding) a PDCCH by a UE, the UE may detect a beam failure.

Otherwise, in the case that multiple PDCCHs are transmitted through multiple beams (or multiple PDCCHs are transmitted different beams, respectively), the beam failure event occurrence may be determined by the detection performance of a specific PDCCH (e.g., PDCCH associated with a serving beam).

Here, each of multiple PDCCHs may be transmitted and/or received for each of different beams in different control channel region (e.g., symbol, slot, subframe, etc.).

In this case, a control channel region for each beam may be predefined or transmitted/received through higher layer signaling.

In addition, when an occurrence of the beam failure event is determined by beam pair link(s) quality of the associated control channel, whether the beam failure even is occurred may be determined according to a case that only DL beam quality is degraded under a predetermined level, only UL beam quality is degraded under a predetermined level, both of DL beam and UL beam quality are degraded under a predetermined level.

Here, "under a predetermined level" may mean lower than a threshold value, time-out of an associated timer, and the like.

In addition, as a signal for detecting the beam failure, BRS, RS for fine timing/frequency tracking, SS Blocks, DM-RS for PDCCH, DM-RS for PDSCH, and so on may be used.

Next, in describing a process of identifying a new candidate beam, a UE finds a new candidate beam by monitoring beam detection RS.

Beam identification RS includes information of 1) periodic CSI-RS for beam management when it is configured by NW and 2) periodic CSI-RS and SS block in a serving cell when the SS block is used for beam management.

Next, in describing a process of transmitting a beam failure recovery request, the information carried by the beam failure recovery request includes at least one of 1) explicit/implicit information for identifying a UE and a new gNB TX beam information, or 2) explicit/implicit information on whether a UE is identified and a new candidate beam is existed.

In addition, a transmission of the beam failure recovery request may select one of PRACH, PUCCH and PRACH-like (e.g., different parameter for preamble sequence from PRACH).

Beam failure recovery request resource/signal may be additionally used for scheduling request.

Next, a UE monitors a control channel search space in order to receive a gNB response to the beam failure recovery request.

As described above, in NR, the beam recovery request message may support both of two types of mechanism including (1) being transmitted using the same symbols as PRACH (first case), and (2) being transmitted using symbols other than PRACH (second case).

The first case is a mechanism useful in the case that even uplink synchronization is lost due to beam failure (the case that relatively greater beam quality is degraded or alternative beam is not existed), and/or the timing of beam failure event occurrence and the preconfigured PRACH resource are near in time.

The second case is a mechanism useful in the case that it is beam failure situation but uplink synchronization is not lost (the case that relatively smaller beam quality is degraded or alternative beam is existed), and/or the timing of beam failure event occurrence and the preconfigured PRACH resource are far in time and fast beam recovery is hard for waiting PRACH resource (e.g., symbol).

Furthermore, a UE may perform Radio Link Failure (RLF) operation when beam failure occurs in the case that after transmitting a beam recovery request message to an eNB for a certain times, it is unable to receive a response to the request from the eNB.

Hereinafter, a mechanism for beam failure recovery in the case where a beam failure occurs will be briefly described.

Beam failure event occurs when the quality of beam pair link(s) of an associated control channel falls low enough (e.g. comparison with a threshold, time-out of an associated timer).

Mechanism to recover from beam failure is triggered when beam failure occurs.

Here, the beam pair link is used for convenience, and may or may not be used.

Whether quality can additionally include quality of beam pair link(s) associated with NR-PDSCH.

When multiple Y beam pair links are configured, X (<=Y) out of Y beam pair links falls below certain threshold fulfilling beam failure condition may declare beam failure.

Search space (UE-specific vs. common) of the associated NR-PDCCH can be defined.

Signaling mechanisms for NR-PDCCH in the case of UE are configured to monitor multiple beam pair links for NR-PDCCH.

The following signals can be configured for detecting beam failure by UE and for identifying new potential beams by UE.

The signals, e.g., RS for beam management, RS for fine timing/frequency tracking, SS blocks, DM-RS of PDCCH (including group common PDCCH and/or UE specific PDCCH), DMRS for PDSCH.

If beam failure event occurs and there are no new potential beams to the serving cell, whether or not the UE provides an indication to L3.

The criterion for declaring radio link failure is for RAN2 to decide.

NR supports configuring resources for sending request for recovery purposes in symbols containing RACH and/or scheduling request or in other indicated symbols.

The following mechanisms should be supported in NR:

The UL transmission to report beam failure can be located in the same time instance as PRACH:

Resources Orthogonal to PRACH Resources orthogonal in frequency and/or sequences (not intended to impact PRACH design)

The UL transmission to report beam failure can be located at a time instance (configurable for a UE) different from PRACH.

Consider the impact of RACH periodicity in configuring the UL signal to report beam failure located in slots outside PRACH.

Additional mechanisms using other channels/signals are not precluded (e.g., SR, UL grant free PUSCH, UL control).

UE Beam Failure Recovery Mechanism Includes the Following Aspects:

- Beam failure detection
- New candidate beam identification
- Beam failure recovery request transmission
- UE monitors gNB response for beam failure recovery request Beam Failure Detection:

- UE monitors beam failure detection RS to assess if a beam failure trigger condition has been met
- Beam failure detection RS at least includes periodic CSI-RS for beam management SS-block within the serving cell can be considered, if SS-block is also used in beam management as well.

New Candidate Beam Identification:

- UE monitors beam identification RS to find a new candidate beam

Beam identification RS includes:

Periodic CSI-RS for beam management, if it is configured by NW.

Periodic CSI-RS and SS-blocks within the serving cell, if SS-block is also used in beam management as well.

Beam Failure Recovery Request Transmission:

- Information carried by beam failure recovery request includes at least one followings Explicit/implicit information about identifying UE and new gNB TX beam information Explicit/implicit information about identifying UE and whether or not new candidate beam exists Down-selection between the following options for beam failure recovery request transmission

PRACH

PUCCH

PRACH-like (e.g., different parameter for preamble sequence from PRACH)

Beam failure recovery request resource/signal may be additionally used for scheduling request UE monitors a control channel search space to receive gNB response for beam failure recovery request The control channel search space can be same or different from the current control channel search space associated with serving BPLs UE further reaction if gNB does not receive beam failure recovery request transmission Study how to support at least one mechanism when NW receive the beam failure recovery request.

E.g., NW assigns UL grant for beam reporting, NW transmits DL RS for beam measurement, NW signal beam indication or confirmation to UE, etc.

E.g., UE assistance on NW decision of which mechanism to apply.

Whether or not a specific mechanism has specification impact.

Support at least the following triggering condition(s) for beam failure recovery request transmission:

Condition 1: when beam failure is detected and candidate beam is identified at least for the case when only CSI-RS is used for new candidate beam identification Condition 2: Beam failure is detected alone at least for the case of no reciprocity How the recovery request is transmitted without knowledge of candidate beam.

If both conditions are supported, which triggering condition to use by UE also depends on both gNB configuration and UE capability.

Support the Following Channel(s) for Beam Failure Recovery Request Transmission:

Non-contention based channel based on PRACH, which uses a resource orthogonal to resources of other PRACH transmissions, at least for the FDM case.

Other ways of achieving orthogonality, e.g., CDM/TDM with other PRACH resources.

Whether or not have different sequence and/or format than those of PRACH for other purposes This does not prevent PRACH design optimization attempt for beam failure recovery request transmission from other agenda item Retransmission behavior on this PRACH resource is similar to regular RACH procedure Support using PUCCH for beam failure recovery request transmission Whether PUCCH is with beam sweeping or not This may or may not impact PUCCH design Contention-based PRACH resources as supplement to contention-free beam failure recovery resources From traditional RACH resource pool 4-step RACH procedure is used Contention-based PRACH resources is used e.g., if a new candidate beam does not have resources for contention-free PRACH-like transmission Whether a UE is semi-statically configured to use one of them or both, if both, whether or not support dynamic selection of one of the channel(s) by a UE if the UE is configured with both.

To receive gNB response for beam failure recovery request, a UE monitors NR PDCCH with the assumption that the corresponding PDCCH DM-RS is spatial QCL'ed with RS of the UE-identified candidate beam(s)

Whether the candidate beam(s) is identified from a pre-configured set or not

Detection of a gNB's response for beam failure recovery request during a time window is supported The time window is configured or pre-determined The number of monitoring occasions within the time window The size/location of the time window If there is no response detected within the window, the UE may perform re-tx of the request If not detected after a certain number of transmission(s), UE notifies higher layer entities The number of transmission(s) or possibly further in combination with or solely determined by a timer In beamformed systems, UE mobility/rotation and beam blockage could impact on L1, L2, and L3 operations such as frequent HARQ retransmission in L1/L2 and link failure in L3.

In RAN2 perspective, how to provide fast link recovery in NR can be an important topic in this regard. However, it will be better to provide physical layer mechanisms to prevent link failure situation (i.e., link quality below certain threshold for a long time) as much as possible.

From RAN1 perspective, mechanism to support fast switching of beam(s) can be considered for providing robustness to control/data channels. Both network initiated and UE initiated methods can be considered. For network initiated methods, network can trigger or activate DL or UL RS transmission. UE could report beam information only when indicated/configured. Limitation of these methods is when UE does not transmit any signal or feedback information for a relatively long time.

For example, periodic beam reporting and periodic CSI reporting can be configured to a UE for fast link adaptation. If the reporting period(s) is too short, original purpose can be met but it could consume too much DL/UL resource.

Therefore, it was agreed to support UE initiated methods as well as network initiated methods. It was also agreed that UL transmission is done when UE detects degradation of beam/link quality from periodic CSI-RS for beam management.

SS block within the serving cell can also be used for beam management to reduce the CSI-RS overhead. Also, serving beam of NR-PDCCH would be associated with SS block until beam refinement procedure by using CSI-RS for beam management is performed. Network can freely choose which RS to use for beam management. For high mobility UE, for example, network can configure SS blocks as beam management RSs to avoid unnecessary measurement and reporting which can be easily outdated due to UE mobility. Thus, SS block needs to be allowed to be used for beam failure detection if UE is configured to use only SS block(s) for beam management.

<Proposal 1>

For beam management, support both SS block based and CSI-RS based beam management. Network can configure which RS to use for a beam reporting setting.

<Proposal 2>

Beam failure event is defined for the configured RS for beam management, either SS block or CSI-RS.

If UE is configured to operate with CSI-RS based beam management, beam recovery can be used for the following two cases;

Case 1: For changing serving CSI-RS beam among configured CSI-RS beams.

Case 2: For asking to transmit new CSI-RS beams

Figure 7:
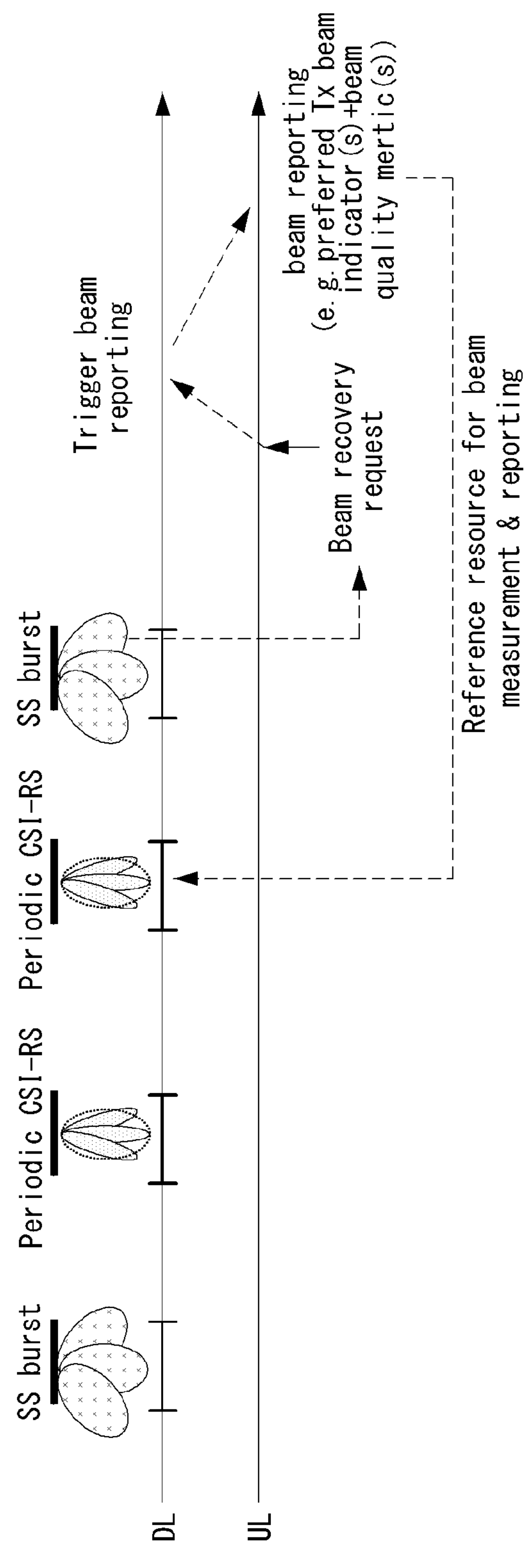
FIG. 7 shows a description for Case 1.
Figure 8:
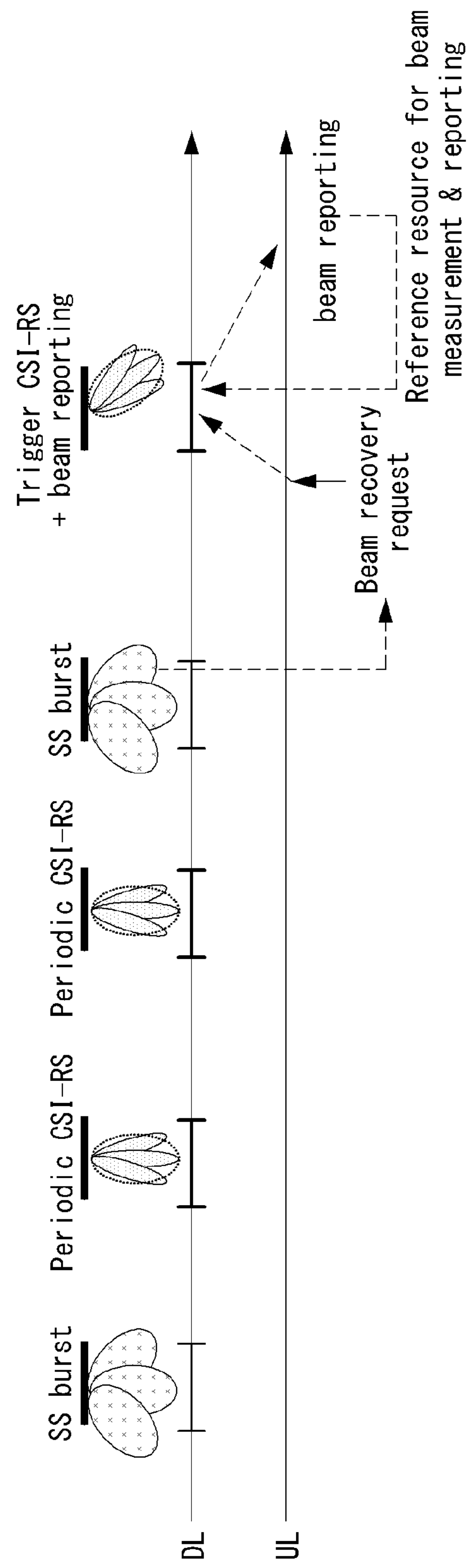
FIG. 8 shows a description for Case 2.

FIG. 7 shows a description for Case 1, and FIG. 8 shows a description for Case 2.

In Case 1 as shown in FIG. 7, it is assumed that UE can find new CSI-RS beam(s) from periodically transmitted/configured CSI-RS for beam management. Then, UL beam failure recovery signal is transmitted to acquire a UL container for beam information reporting. In this case, the UL channel associated with serving SS block can be used for sending beam recovery request.

In Case 2 as shown in FIG. 8, it is assumed that there is no new CSI-RS beam(s) from periodically transmitted/configured CSI-RS for beam management. From the SS burst set, UE can find the best SS block to recover from beam failure so that the best SS block can be regarded as a new candidate beam and used to identify the UL channel for sending beam recovery request. In that case, TRP can transmit CSI-RS for beam refinement to the UE upon reception of UL signal and then UE could report CSI-RS beam information subsequently.

<Proposal 3>

SS block is also used for new candidate beam identification.

As mentioned above, gNB can recognize beam failure through UL signal, and then it would be needed to take appropriate actions such as allocation of UL resource to report CSI-RS beam information (i.e., Case 1) or transmission of CSI-RSs for beam refinement (i.e., Case 2). Regarding recovery request, gNB can make a final decision on which action to apply. Since gNB does not have any information whether the UE has CSI-RS beam information measured previously or not, it would be necessary for UE to report the information of having new candidate CSI-RS beam information or not for fast and efficient beam refinement. This information could be included in UL beam recovery request signal/resource. For example, UL signal/resource for beam recovery can be separately assigned for Case 1 and 2, respectively, so that UE can indicate gNB the preference between them.

<Proposal 4>

NR supports explicit/implicit signaling for indicating whether or not new CSI-RS beam exists.

For the UL transmission for the beam recovery request, it was agreed that network explicitly configures to UE with resources for UL transmission of signals for recovery purpose. Considering UL timing synchronization aspects, TRP Rx beam setting for listening the request, and standard impact, one of solutions would be to dedicate some PRACH resources for the purpose of beam recovery request. TRP can distinguish whether UE needs random access or beam recovery from the detection of PRACH signal. If there are sufficient PRACH resources, non-contention based PRACH seems to be appropriate for this purpose. In order not to impact on PRACH design, we can also consider a UL signal transmitted at the resource which is orthogonal to PRACH resources in a FDM or CDM manner. Here, the FDM case was supported.

Then, CDM case is also preferred for non-contention based channel based on PRACH. Some sequences of PRACH can be dedicated for the usage of beam recovery request so that no additional time/frequency resource is needed in the CDM case.

UL signal/resource for beam failure recovery transmitted to resources FDMed/CDMed with PRACH resources is called as dedicated PRACH beam recovery resource for convenience. TRP may sweep its Rx beam for reception of the dedicated PRACH resource so that the information payload size transferrable with dedicated PRACH resource would be very small. In addition, contention based PRACH resources can be also used for beam recovery request transmission so as to supplement dedicated PRACH beam recovery resources.

It is also supported that UL signal/resource for beam failure recovery can be transmitted at a time instance different from PRACH.

It is agreed to use PUCCH as well as PRACH-like resource for the beam recovery request. The candidate beam(s) for PUCCH transmission for beam recovery request would be identified from a preconfigured set. Also, these PUCCH resources can also be used for fast beam failure recovery request when UL beam pair link still alive. The dedicated PRACH resource may have long periodicity according to PRACH configuration so that PUCCH can be configured to use with shorter period. Since PUCCH with shorter duty cycle can sufficiently supplement the dedicated PRACH resource so that TDMed resource with PRACH would not be necessary. TRP can configure PUCCH and it could contain more beam information such as preferred Tx beam indicator and/or its beam quality according to its size (e.g. number of symbols). Depending on the payload size of PUCCH for beam recovery request, subsequent procedures, i.e. beam reporting triggering and beam reporting, may not be needed. It is also considerable that partial beam information (e.g., differential RSRP) is reported together with beam failure recovery request.

<Proposal 5>

Support the following triggering condition for beam failure recovery request transmission:

Condition 2: Beam failure is detected alone

<Proposal 6>

Support the following channels for beam failure recovery request transmission

Non-contention based channel based PRACH which is CDMed with PRACH resources

TDM case is not necessary.

FDM case is already supported.

Contention-based PRACH to supplement non-contention based channel based

PRACH

<Proposal 7>

When using PUCCH, some parts of beam information can be reported together with beam failure recovery request according to payload size of PUCCH.

For beam failure recovery request, UE can be configured to use multiple resources such as dedicated PRACH and PUCCH at the same time. In this case, one of the resources can be restricted to be used for resending the beam recovery request. For example, if there is no response from gNB after beam failure recovery request, UE may need to resend the request message by using only dedicated PRACH resource instead of PUCCH. It is because PUCCH can be used for fast beam recovery request but it is vulnerable to channel variation and thus it is safer to use dedicated PRACH resource for resending the message.

<Proposal 8>

If UE is configured to use both dedicated PRACH and PUCCH for beam recovery request, dedicated PRACH needs to be used if initial request is failed to be delivered.

We have studied the mechanism to recover from beam failure and proposed as following:

(Proposal 1): For beam management, support both SS block based and CSI-RS based beam management. Network can configure which RS to use for a beam reporting setting.

(Proposal 2): Beam failure event is defined for the configured RS for beam management, either SS block or CSI-RS.

(Proposal 3): SS block is also used for new candidate beam identification.

(Proposal 4): NR supports explicit/implicit signaling for indicating whether or not new CSI-RS beam exists.

(Proposal 5): Support the following triggering condition for beam failure recovery request transmission:

Condition 2: Beam failure is detected alone (Proposal 6): Support the following channels for beam failure recovery request transmission Non-contention based channel based PRACH which is CDMed with PRACH resources TDM case is not necessary.

FDM case is already supported.

Contention-based PRACH to supplement non-contention based channel based PRACH (Proposal 7): When using PUCCH, some parts of beam information can be reported together with beam failure recovery request according to payload size of PUCCH.

(Proposal 8): If UE is configured to use both dedicated PRACH and PUCCH for beam recovery request, dedicated PRACH needs to be used if initial request is failed to be delivered.

As described above, in order for a UE to transmit a beam failure recovery request to an eNB, a plurality of beam recovery request channels/signals may be considered.

The beam recovery request channel (or signal) uses the same time resource as Physical Random Access Channel (PRACH), and non-contention based channel based on PRACH FDMed/CDMed with RRACH resource or contention based PRACH channel may be considered (hereinafter, this may be referred to as 'type A recovery resource').

Otherwise, the beam recovery request channel (or signal) uses a time resource except the PRACH, PUCCH and/or non-contention based channel based PRACH TDMed with RRACH resource may also be considered (hereinafter, this may be referred to as 'type B recovery resource').

That is, the type A recovery resource may be referred to as the case of using the same time resource as PRACH, and the type B recovery resource may be referred to as the case of using different time resource than PRACH.

In addition, the UE may be configured with various resources for the beam failure recovery from the eNB.

Hereinafter, an operation of a UE configured with a plurality of beam recovery request resource proposed in the present disclosure will be described through various embodiments.

First Embodiment

According to the first embodiment, in the case that a UE is allocated (or configured) with a plurality of beam recovery request resources from an eNB, the UE may receive an indication or configuration that a part of the allocated resources is restricted as a retransmission resource for the beam recovery request from the eNB.

In the case that the UE detects a beam failure, the UE may request a beam (failure) recovery to the eNB using one of the resources allocated or configured from the eNB.

After the UE request the beam recovery to the eNB, in the case that the UE is unable to receive a response to the request from the eNB (e.g., gNB) during a predetermined time window, the UE may request a beam recovery request again to the eNB.

AT this time, a part (e.g., PUCCH or non-contention based channel based PRACH TDMed with RRACH resource) of the beam recovery request resource may be allocated for fast beam recovery.

Otherwise, in the case that a specific or a part of DL beam fair link is failed and/or UL beam fair link is existed, it is highly probable that a part of beam recovery request resource is reused, the eNB may consider it and indicate or configure the restriction for the use as retransmission resource to the UE.

For example, in the case of the UE not using PUCCH resource (i.e., type B recovery resource) as a retransmission resource, the UE requests a beam recovery request initially with PUCCH, and in the case that the UE is unable to receive a response to the beam recovery request (i.e., in the case that channel fluctuation is significant to the extent that fast beam recovery is impossible and/or UL beam failure link is regarded as failure and/or all of DL beam fair links are failed), the UE may not not retransmit to the PUCCH, but may transmit a beam recovery request to the eNB by using Type A recovery resource.

(Method 1)

In the case that a UE is allocated or configured with a plurality of beam recovery request resources from an eNB, the UE may be configured or indicated with a transmission priority or condition for the beam recovery request from the eNB.

Here, a transmission period or timing that may request of the type A recovery resource and the type B recovery resource described above may be differently defined for each type.

As the simplest method, in the case that the UE determines beam failure detection, the UE may perform the beam recovery request by using a beam recovery request resource configured on the fastest timing.

In the case that the transmission timing difference between the type A recovery resource and the type B recovery resource is within 'x' slots (or symbols) set by a specific eNB, the UE may receive an instruction or a configuration for priority to transmit type A recovery resource preferentially even in the case that the type B recovery resource is firstly incoming.

In addition, the beam failure condition may have a plurality of states according to a plurality of threshold values or the number of beam failure links.

Accordingly, the eNB may instruct or configure the resource for a transmission of beam recovery request according to the beam failure state.

For example, the eNB may instruct or configure to the UE such that in the case that only a part of beam is failed or beam failure degree is low (e.g., beam failure state 1), the UE may perform beam recovery using the type B recovery resource preferentially, and in the case that most of beam is failed or beam failure degree is high (e.g., beam failure state 2), the UE may perform beam recovery using the type A recovery resource preferentially.

In addition, in the case that only the specific or a part of beam fair link is failed or beam link failure is occurred, and in the case that the UE uses the type B (e.g., PUCCH)

recovery resource for beam failure recovery (preferentially), the eNB may transmit an index or information on which beam link is failed in the type B recovery resource.

Second Embodiment

Next, the case of using the type B recovery resource for a beam recovery request will be described in more detail through the second embodiment.

According to the second embodiment, in the case of using PUCCH format (or UCI) for a beam failure recovery, it may be defined that the PUCCH format has higher priority than other PUCCH format (or UCI) (e.g., PUCCH for use of CSI report, PUCCH format for use of Ack/Nack and PUCCH for use of data scheduling request.

As described in the first embodiment, for a beam failure recovery request, a UE may use PUCCH (type B recovery resource).

Accordingly, for the beam failure recovery, a transmission of separate a PUCCH format (or UCI) may be considered.

The PUCCH format for the beam failure recovery may have higher priority than other PUCCH format (or UCI transmission) for fast link recovery.

For example, in the case that a beam recovery is required for a UE in which a PUCCH, a PUCCH transmission for use of ACK (Acknowledgement)/NACK (Non-Acknowledgement), a PUCCH for use of UL data scheduling request are configured in a corresponding slot (or subframe), the UE transmits a beam failure recovery PUCCH format (or Uplink Control Information; UCI) to an eNB preferentially.

In the case that a simultaneous transmission of the beam failure recovery PUCCH format and other PUCCH format is impossible, the other PUCCH format (or UCI transmission) may be dropped.

The priority rule for the PUCCH transmission may be instructed or configured through higher layer signaling to the UE by the eNB.

In addition, two types of PUCCH for the beam failure recovery request may be considered.

A first type is a beam failure indication type (hereinafter, referred to as 'indicator type PUCCH') indicating only whether on/off or lbit beam failure like data scheduling request.

A second type is 'message type PUCCH' that includes additional information in addition to a beam recovery request such as an index for beam candidate newly found in the corresponding PUCCH, RSRP, an index indicating which serving beam link is cracked previously, and so on.

At this time, the 'indicator type PUCCH' is associated with each of N (analogue) beams managed by an eNB and total N (or <N) resources may be configured with a UE, which is similar to contention-based PRACH.

For example, in the case that a beam failure occurs, a UE may find a new beam candidate, and may perform a beam failure recovery request operation by using the 'indicator type PUCCH' which is configured with the new beam.

Here, in the case of the indicator type PUCCH, and in the case that the eNB receives the corresponding PUCCH by using an association with eNB management beams, the eNB may know the new beam candidate of the UE implicitly.

An eNB may configure the 'message type PUCCH' with being associated with a specific K (<N) number of the best beam (or serving beam link) to the corresponding UE.

For example, in the case that the first best beam (or first serving beam link) is announced to be beam failure, a UE may request a beam failure recovery to an eNB by using the message type PUCCH which is configured with the first best beam.

At this time, a fast beam recovery may be performed through a transmission of the information for an additional new beam candidate additionally as described above.

With respect to a UE to which all of the indicator type PUCCH, message type PUCCH and/or a non-contention-based PRACH channel (e.g., type A recovery resource) are allocated, the UE may perform a beam failure recovery request in stages.

(1) Step 1

In step 1, when a beam failure occurs in a specific or a part of serving beam link, a beam failure recovery request is performed through the message type PUCCH that corresponds to the best beam.

(2) Step 2

In step 2, in the case that a request performance is failed in the step 1 and it is unable to receive an eNB response, a UE performs a recovery request by using the indicator type PUCCH or a non-contention based channel based PRACH.

(3) Step 3: In the case that step 2 is also failed, a UE performs a recovery request by using contention based PRACH.

In addition, a beam failure occurs in all serving beam link in a time window of the beam failure recovery request, in order to reduce UL interference and power consumption, a UE may exclude the message type PUCCH, and perform a beam recovery request through the indicator type PUCCH and/or non-contention based channel based PRACH.

Next, in the case of the UE that performs a beam failure recovery request with the 'Message type PUCCH', the UE may receive PDCCH by assuming a spatial QCL parameter previously configured for a response of an eNB to the recovery request.

In order for the UE to receive a response of a gNB in response to the beam failure recovery request, the UE monitors NR PDCCH with the assumption that the corresponding PDCCH DM-RS is in spatial QCL with an RS of candidate beams that are identified in the UE.

That is, in order to a response of an eNB to the beam recovery request, the UE may receive PDCCH by assuming the spatial QCL to an RS of the candidate beam that the UE itself found.

In other words, using the reception beam of the candidate beam RS that the UE found, the UE receives a response to the recovery request from the eNB.

The 'Message type PUCCH' may be used mainly, as described above, when only a specific or a part of DL beam fair link is failed, or UL beam fair link is still alive.

For example, an eNB may instruct or configure a multi-beam PDCCH monitoring using two serving beams (e.g., primary serving beam having shorter period than secondary serving beam and secondary serving beam having longer period than primary serving beam) to a UE.

At this time, using the 'Message type PUCCH', when a beam failure occurs only in primary serving beam mainly, a beam recovery request may be performed with a reciprocal UL beam of the secondary beam or a beam recovery request may be performed with a preconfigured UL beam.

At this time, since a UE may expect a response reception of an eNB for the recovery request using the message type PUCCH in the corresponding PDCCH of the existing secondary serving beam, the UE receives PDCCH by assuming a spatial QCL parameter which is previously configured.

That is, the message type PUCH may operate as a main serving beam(s) switch request.

Figure 9:
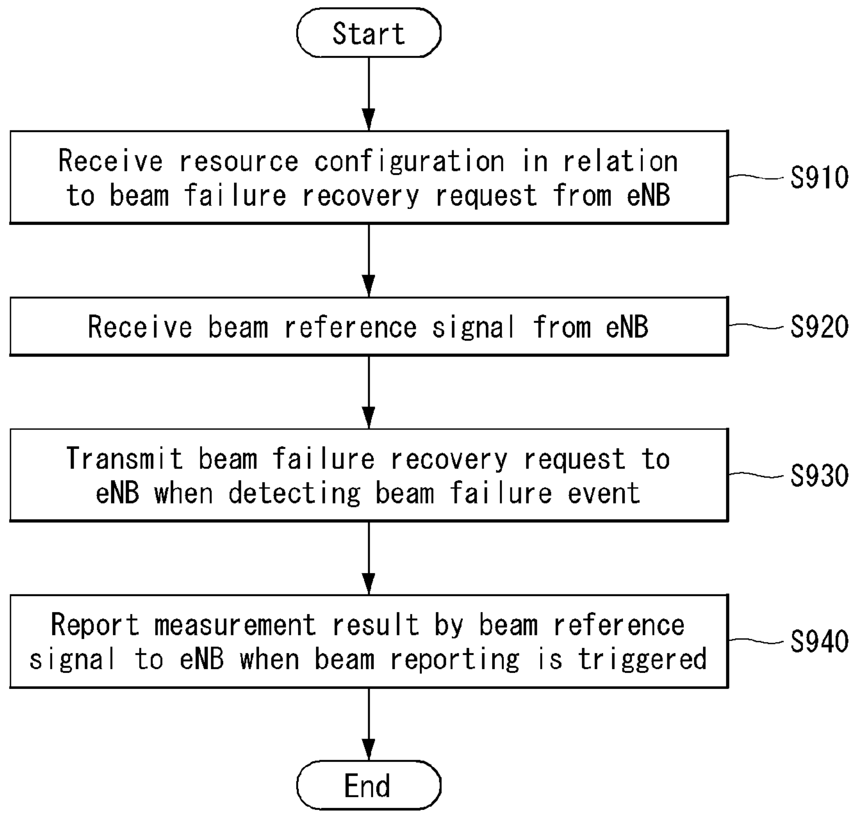
FIG. 9 is a flowchart illustrating an example of a method for performing a beam failure recovery proposed in the present disclosure.

FIG. 9 is a flowchart illustrating an example of a method for performing a beam failure recovery proposed in the present disclosure.

First, a UE receives a resource configuration in relation to a beam failure recovery request from an eNB (step, S910).

Here, a specific resource of a resource in relation to the beam failure recovery request may not be used as a second resource that will be described below.

Later, the UE receives a beam reference signal (BRS) used for beam management from the eNB (step, S920).

Later, in the case that a beam failure event is detected, the UE transmits the beam failure recovery request to the eNB using a first resource based on the resource configuration (step, S930).

Here, the beam failure recovery request may use the same time resource with Physical Random Access Channel (PRACH), and may be Frequency-Division-Multiplexed with the PRACH in the time resource.

Otherwise, the first resource may be non-contention based PRACH.

In this case, the second resource that will be described below may be contention based PRACH.

That is, the UE transmits a beam failure recovery request through the non-contention base PRACH, and in the case that the UE is unable to receive a response to the beam failure recovery request from the eNB, the UE may transmit the beam failure recovery request through the contention based PRACH.

In addition, the beam failure recovery request may be transmitted through Physical Uplink Control Channel (PUCCH).

Particularly, the beam failure recovery request may be transmitted to the eNB by using the indicator type PUCCH that indicates only a beam failure or the message type PUCCH that includes information of a candidate beam.

In the case that the beam failure recovery request is the message type PUCCH, the UE may receive a response to the beam failure recovery request by assuming QCL in a Reference Signal (RS) of the candidate beam.

That is, the UE may receive a response (PDCCH) in response to the beam failure recovery request using the beam of receiving the RS of the candidate beam.

Additionally, in the case that the UE is unable to receive a response to the beam failure recovery request from the eNB, the UE may retransmit the beam failure recovery request using the second resource.

Here, in the case that the indicator type PUCCH and the message type PUCCH are allocated for the beam failure recovery request, and the beam failure event is a beam failure for a specific serving beam link, the UE may transmit the beam failure recovery request using the message type PUCCH in the first resource, and in the case that the UE fails to receive a response to the beam failure recovery request, the UE may retransmit the beam failure recovery request using the indicator type PUCCH in the second resource.

In addition, in the case that the beam failure recovery request is overlapped with other PUCCH format in the first resource, the other PUCCH format may be dropped.

That is, the beam failure recovery request may have the highest priority.

Later, in the case that a beam reporting is triggered, the UE reports a measurement result by the beam reference signal to the eNB (step, S940).

Overview of Devices to which the Present Invention May be Applied

Figure 10:
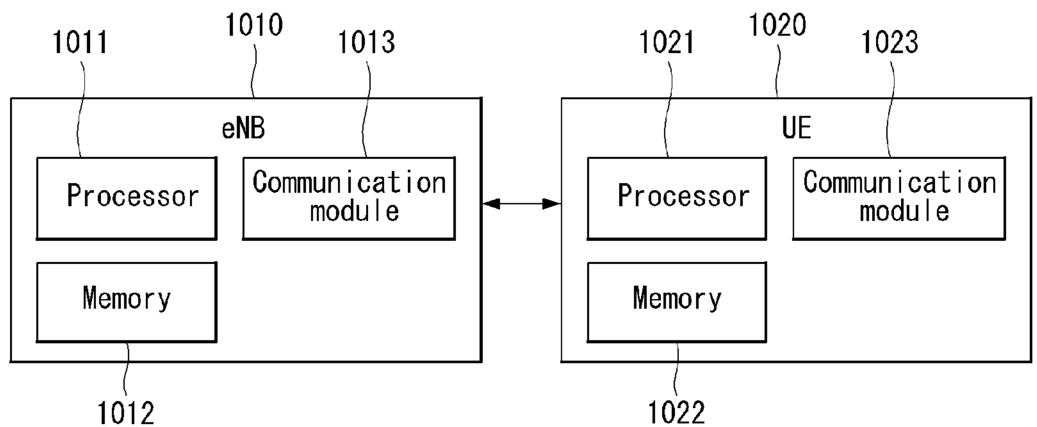
FIG. 10 illustrates a block diagram of a wireless communication device according to an embodiment of the present invention.

FIG. 10 illustrates a block diagram of a wireless communication device according to an embodiment of the present invention.

With reference to FIG. 10, a wireless communication system includes an eNB (or network node) 1010 and a UE 1020.

The eNB 1010 includes a processor 1011, a memory 1012, and communication module 1013.

The processor 1011 implements proposed functions, processes and/or methods proposed through FIG. 1 to FIG. 17. The processor 1011 may implement layers of wired/wireless interface protocol. The memory 1012, being connected to the processor 1011, stores various types of information for driving the processor 1011. The communication module 1013, being connected to the processor 1011, transmits and/or receives wired/wireless signals.

The communication module 1013 may include a Radio Frequency (RF) unit for transmitting/receiving a radio signal.

The UE 1020 includes a processor 1021, memory 1022, and communication module (or RF unit) 1023. The processor 1021 implements proposed functions, processes and/or methods proposed through FIG. 1 to FIG. 9. The processor 1021 may implement layers of wired/wireless interface protocol. The memory 1022, being connected to the processor 1021, stores various types of information for driving the processor 1021. The communication module 1023, being connected to the processor 1021, transmits and/or receives wired/wireless signals.

The memories 1012 and 1022 may be installed inside or outside the processors 1011 and 1021 and may be connected to the processor 1011 and 1021 through various well-known means.

In addition, the eNB 1010 and/or the UE 1020 may have a single antenna or multiple antennas.

Figure 11:
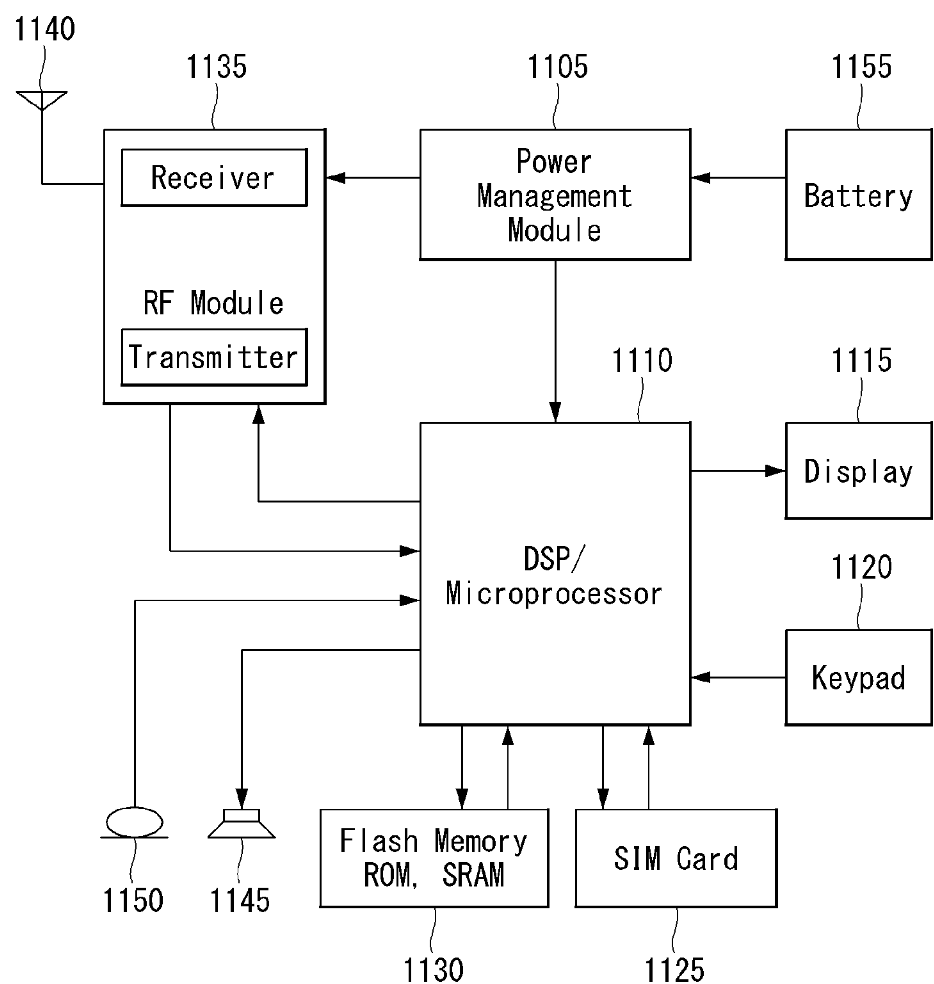
FIG. 11 illustrates a block diagram of a communication apparatus according to an embodiment of the present invention.

FIG. 11 illustrates a block diagram of a communication apparatus according to an embodiment of the present invention.

Particularly, in FIG. 11, the UE described above FIG. 10 will be exemplified in more detail.

Referring to FIG. 11, the UE includes a processor (or digital signal processor; DSP) 1110, an RF module (RF unit) 1135, a power management module 1105, an antenna 1140, a battery 1155, a display 1115, a keypad 1120, a memory 1130, a Subscriber Identification Module (SIM) card 1125 (which may be optional), a speaker 1145 and a microphone 1150. The UE may include a single antenna or multiple antennas.

The processor 1110 may be configured to implement the functions, procedures and/or methods proposed by the present invention as described in FIG. 1 to FIG. 9. Layers of a wireless interface protocol may be implemented by the processor 1110.

The memory 1130 is connected to the processor 1110 and stores information related to operations of the processor 1110. The memory 1130 may be located inside or outside the processor 1110 and may be connected to the processors 1110 through various well-known means.

A user enters instructional information, such as a telephone number, for example, by pushing the buttons of a keypad 1120 or by voice activation using the microphone 1150. The processor 1110 receives and processes the instructional information to perform the appropriate function, such as to dial the telephone number. Operational data may be retrieved from the SIM card 1125 or the memory module 1130 to perform the function. Furthermore, the processor

1110 may display the instructional and operational information on the display 1115 for the user's reference and convenience.

The RF module 1135 is connected to the processor 1110, transmits and/or receives an RF signal. The processor 1110 forwards instructional information to the RF module 1135, to initiate communication, for example, transmits radio signals comprising voice communication data. The RF module 1135 includes a receiver and a transmitter to receive and transmit radio signals. An antenna 1140 facilitates the transmission and reception of radio signals. Upon receiving radio signals, the RF module 1135 may forward and convert the signals to baseband frequency for processing by the processor 1110. The processed signals may be transformed into audible or readable information outputted via the speaker 1145.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR INVENTION

Various forms for implementing the present invention have been described in the best mode for implementing the present invention.

INDUSTRIAL APPLICABILITY

A signal transmission and reception method using a beam in a wireless communication system of the present invention applied to a 3GPP LTE/LTE-A system, 5G is primarily described as an example, but may be applied to various wireless communication systems in addition to the 3GPP LTE/LTE-A system, and 5G.

The invention claimed is:

1. A method performed by a user equipment (UE) in a wireless communication system, the method comprising:

receiving, from a base station (BS), configuration information including a candidate beam reference signal list (candidate beam RS list) and a threshold related to a beam failure recovery;

detecting a beam failure based on a measurement of a radio link quality for one or more beam failure detection reference signals that include at least one of a Synchronization Signal Block (SSB) or a Channel State Information-Reference Signal (CSI-RS) from the candidate beam RS list;

based on detection of the beam failure, transmitting, to the BS, a beam failure recovery request, wherein, based on i) the beam failure recovery request being transmitted based on a contention free random access resource, ii) the beam failure recovery request being related to a selected SSB or a selected CSI-RS with a radio link quality higher than the threshold from the candidate beam RS list based on the measurement, and iii) a response for the beam failure recovery request not being received within a configured time window: the beam failure recovery request is retransmitted based on a contention based random access resource after the configured time window, wherein the response for the beam failure recovery request is a physical downlink control channel (PDCCH) related to a demodulation reference signal (DM-RS) which is quasi co-located with the selected SSB or the selected CSI-RS; and receiving, from the BS, the response for the beam failure recovery request.

2. The method of claim 1, wherein the method further comprises transmitting, to the BS, a physical uplink control channel (PUCCH) for a fast beam failure recovery request before transmitting the beam failure recovery request based on the contention free random access resource, and wherein the beam failure recovery request based on the contention free random access resource is transmitted based on a response for the fast beam failure recovery not being received from the BS.

3. The method of claim 2, wherein the UE is configured with a primary serving RS with a shorter periodicity, and a secondary serving resource with a longer periodicity, wherein the PUCCH is transmitted based on the secondary serving RS, the fast beam failure recovery request is based on the primary serving RS having a radio link quality lower than the threshold, and the response for the fast beam failure recovery request is a PDCCH related to a DM-RS which is quasi co-located with the secondary serving RS.

4. A user equipment (UE) configured to operate in a wireless communication system, the UE comprising:

a radio frequency (RF) module configured to transmit and receive a radio signal;

a processor functionally connected with the RF module; and a memory connected to the processor and storing instructions that, based on being executed by the processor, configure the processor to perform operations comprising:

receiving, from a base station (BS), configuration information including a candidate beam reference signal list (candidate beam RS list) and a threshold related to a beam failure recovery;

detecting a beam failure based on a measurement of a radio link quality for one or more beam failure detection reference signals that include at least one of a Synchronization Signal Block (SSB) or a Channel State Information-Reference Signal (CSI-RS) from the candidate beam RS list;

based on detection of the beam failure, transmitting, to the BS, a beam failure recovery request, wherein, based on i) the beam failure recovery request being transmitted based on a contention free random access resource, ii) the beam failure recovery request being related to a selected SSB or a selected CSI-RS with a radio link quality higher than the threshold from the candidate beam RS list based on the measurement, and iii) a response for the beam failure recovery request not being received within a configured time window: the beam failure recovery request is retransmitted based on a contention based random access resource after the configured time window, wherein the response for the beam failure recovery request is a physical downlink control channel (PDCCH) related to a demodulation reference signal (DM-RS) which is quasi co-located with the selected SSB or the selected CSI-RS; and receiving, from the BS, the response for the beam failure recovery request.

5. The UE of claim 4, wherein the operations further comprise transmitting, to the BS, a physical uplink control channel (PUCCH) for a fast beam failure recovery request before transmitting the beam failure recovery request based on the contention free random access resource, and wherein the beam failure recovery request based on the contention free random access resource is transmitted based on a response for the fast beam failure recovery not being received from the BS.

6. The UE of claim 5, wherein the UE is configured with a primary serving RS with a shorter periodicity, and a secondary serving resource with a longer periodicity, wherein the PUCCH is transmitted based on the secondary serving RS, the fast beam failure recovery request is based on the primary serving RS having a radio link quality lower than the threshold, and the response for the fast beam failure recovery request is a PDCCH related to a DM-RS which is quasi co-located with the secondary serving RS.

7. A base station (BS) configured to operate in a wireless communication system, the BS comprising:

a radio frequency (RF) module configured to transmit and receive a radio signal;

a processor functionally connected with the RF module; and a memory connected to the processor and storing instructions that, based on being executed by the processor, configure the processor to perform operations comprising:

transmitting, to a user equipment (UE), configuration information including a candidate beam reference signal list (candidate beam RS list) and a threshold related to a beam failure recovery;

based on detection of a beam failure, receiving, from the UE, a beam failure recovery request, wherein the beam failure is detected by the UE based on a measurement of a radio link quality for one or more beam failure detection reference signals that include at least one of a Synchronization Signal Block (SSB) or a Channel State Information-Reference Signal (CSI-RS) from the candidate beam RS list, wherein, based on i) the beam failure recovery request being received from the UE based on a contention free random access resource, ii) the beam failure recovery request being related to a selected SSB or a selected CSI-RS with a radio link quality higher than the threshold from the candidate beam RS list based on the measurement, and iii) a response for the beam failure recovery request not being transmitted to the UE within a configured time window: the beam failure recovery request is re-received based on a contention based random access resource after the configured time window, wherein the response for the beam failure recovery request is a physical downlink control channel (PDCCH) related to a demodulation reference signal (DM-RS) which is quasi co-located with the selected SSB or the selected CSI-RS; and transmitting, to the UE, the response for the beam failure recovery request.

8. The BS of claim 7, wherein the operations further comprise receiving, from the UE, a physical uplink control channel (PUCCH) for a fast beam failure recovery request before transmitting the beam failure recovery request based on the contention free random access resource, and wherein the beam failure recovery request based on the contention free random access resource is received based on a response for the fast beam failure recovery not being transmitted to the UE.

9. The BS of claim 8, wherein the UE is configured with a primary serving RS with a shorter periodicity, and a secondary serving resource with a longer periodicity, wherein the PUCCH is received based on the secondary serving RS, the fast beam failure recovery request is based on the primary serving RS having a radio link quality lower than the threshold, and the response for the fast beam failure recovery request is a PDCCH related to a DM-RS which is quasi co-located with the secondary serving RS.

* * * * *